United States Patent
Takenaka et al.

(10) Patent No.: US 9,614,665 B2
(45) Date of Patent: Apr. 4, 2017

(54) ENCRYPTION PROCESSING METHOD, ENCRYPTION PROCESSING DEVICE, AND COMPUTER-READABLE RECORDING MEDIUM STORING PROGRAM FOR ENCRYPTION PROCESSING

(71) Applicant: FUJITSU LIMITED, Kawasaki-shi, Kanagawa (JP)

(72) Inventors: Masahiko Takenaka, Kawasaki (JP); Yumi Sakemi, Kawasaki (JP); Masaya Yasuda, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 8 days.

(21) Appl. No.: 14/734,259

(22) Filed: Jun. 9, 2015

(65) Prior Publication Data

US 2015/0381348 A1 Dec. 31, 2015

(30) Foreign Application Priority Data

Jun. 30, 2014 (JP) ................................ 2014-135113

(51) Int. Cl.
| | |
|---|---|
| H04L 29/06 | (2006.01) |
| H04L 9/00 | (2006.01) |
| H04L 9/30 | (2006.01) |
| H04L 9/32 | (2006.01) |

(52) U.S. Cl.
CPC ............ *H04L 9/008* (2013.01); *H04L 9/3093* (2013.01); *H04L 9/3231* (2013.01)

(58) Field of Classification Search
CPC .... H04L 9/008; H04L 9/2093; H04L 2209/24
USPC .......................................................... 380/28
See application file for complete search history.

(56) References Cited

U.S. PATENT DOCUMENTS

| | | | | |
|---|---|---|---|---|
| 2007/0156586 | A1* | 7/2007 | Kerschbaum | H04L 9/30 705/50 |
| 2010/0329448 | A1* | 12/2010 | Rane | H04L 9/008 380/28 |
| 2013/0329883 | A1* | 12/2013 | Tamayo-Rios | H04L 9/008 380/28 |

OTHER PUBLICATIONS

C. Gentry, "Fully Homomorphic Encryption Using Ideal Lattices," STOC 2009, pp. 169-178, 2009.

(Continued)

*Primary Examiner* — Dao Ho
(74) *Attorney, Agent, or Firm* — Staas & Halsey LLP

(57) ABSTRACT

An encryption processing method executed by a computer, the method includes converting a first vector using a first polynomial representation to acquire a first polynomial; converting an expression using a second polynomial representation to acquire a second polynomial, the expression being obtained based on a second vector and a random number corresponding to the first vector; converting the random number using at least one of the first polynomial representation and the second polynomial representation to acquire a random number polynomial; encrypting the first polynomial, the second polynomial, and the random polynomial using a homomorphic encryption scheme to acquire the encrypted first polynomial, the encrypted second polynomial, and the encrypted random polynomial; and collating the first vector and the second vector using the encrypted first polynomial, the encrypted second polynomial, and the encrypted random polynomial.

15 Claims, 22 Drawing Sheets

(56) References Cited

OTHER PUBLICATIONS

C. Gentry and S. Halevi, "Implementing Gentry's Fully-Homomorphic Encryption Scheme," EUROCRYPT 2011, LNCS 6632, pp. 129-148, International Association for Cryptologic Research 2011.

M. Yasuda et al., "Secret totalization of purchase histories of companies in cloud," SCIS 2012, pp. 1-8, the Institute of Electronics, Information and Communication Engineers, Jan. 30-Feb. 2, 2012.

Kenneth G. Paterson (Ed.), "Advances in Cryptology—EUROCRYPT 2011", 30$^{th}$ Annual International Conference on the Theory and Applications of Cryptographic Techniques Tallinn, Proceedings, International Association for Cryptological Research, LNCS 6632, May 15-19, 2011, 641 pp.

\* cited by examiner

■ ENCRYPTION TEMPLATE OF COMPARATIVE EXAMPLE
USER ID: ENCRYPTION TEMPLATE $E_1(A)$, $E_1(C)$, $E_2(C)$

\* PBKDF: PASSWORD BASE KEY DERIVATION FUNCTION
STRUCTURE GENERATING KEY AND MASK FROM PASSWORD,
STANDARDIZE WITH PKCS#5 RFC2898

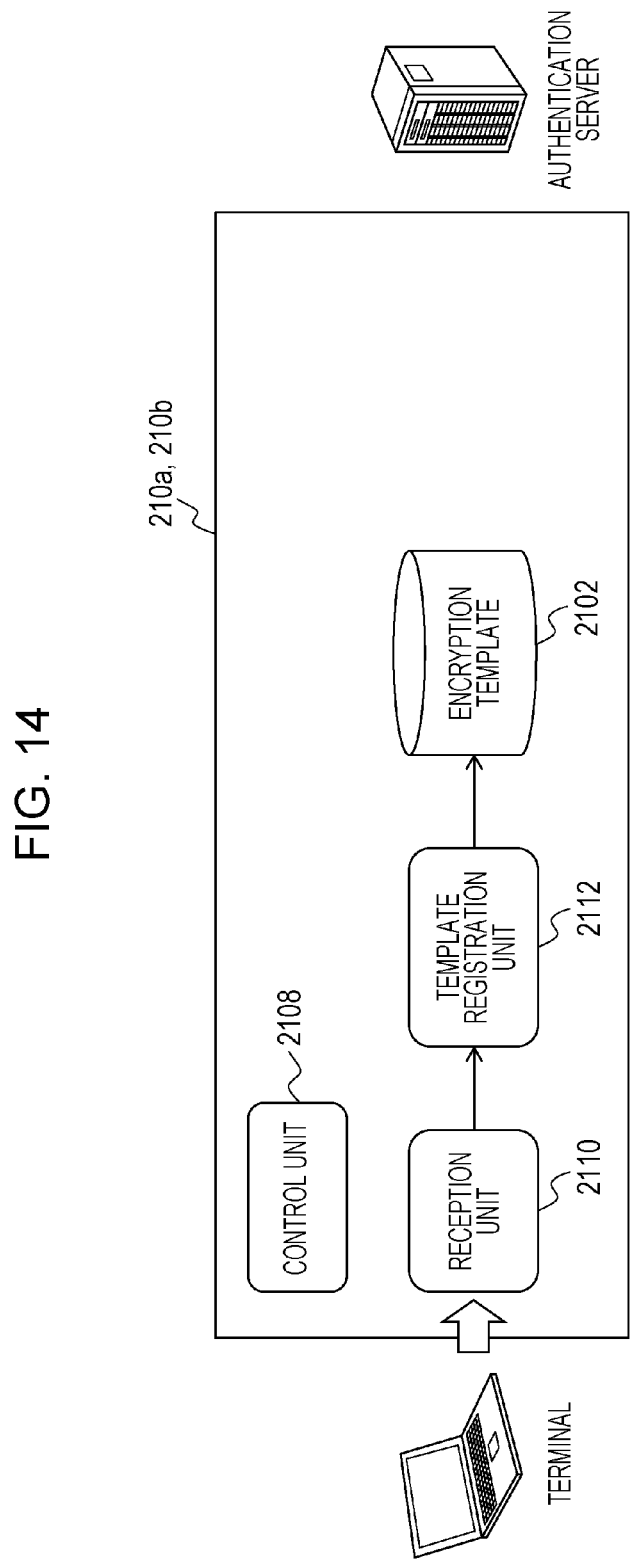

FIG. 15A

■ ENCRYPTION TEMPLATE OF ADDITIVE MASK
USER ID: ENCRYPTION TEMPLATE $E_1(A)$, $E_1(C)$, $E_2(C)$: ENCRYPTION RANDOM NUMBER $E_2(R)$

■ ENCRYPTION TEMPLATE OF MULTIPLICATIVE MASK
USER ID: ENCRYPTION TEMPLATE $E_1(A*R^{-1})$: ENCRYPTION RANDOM NUMBER $E_2(R)$: ENCRYPTION RECIPROCAL $E_1(R^{-1})$

2144

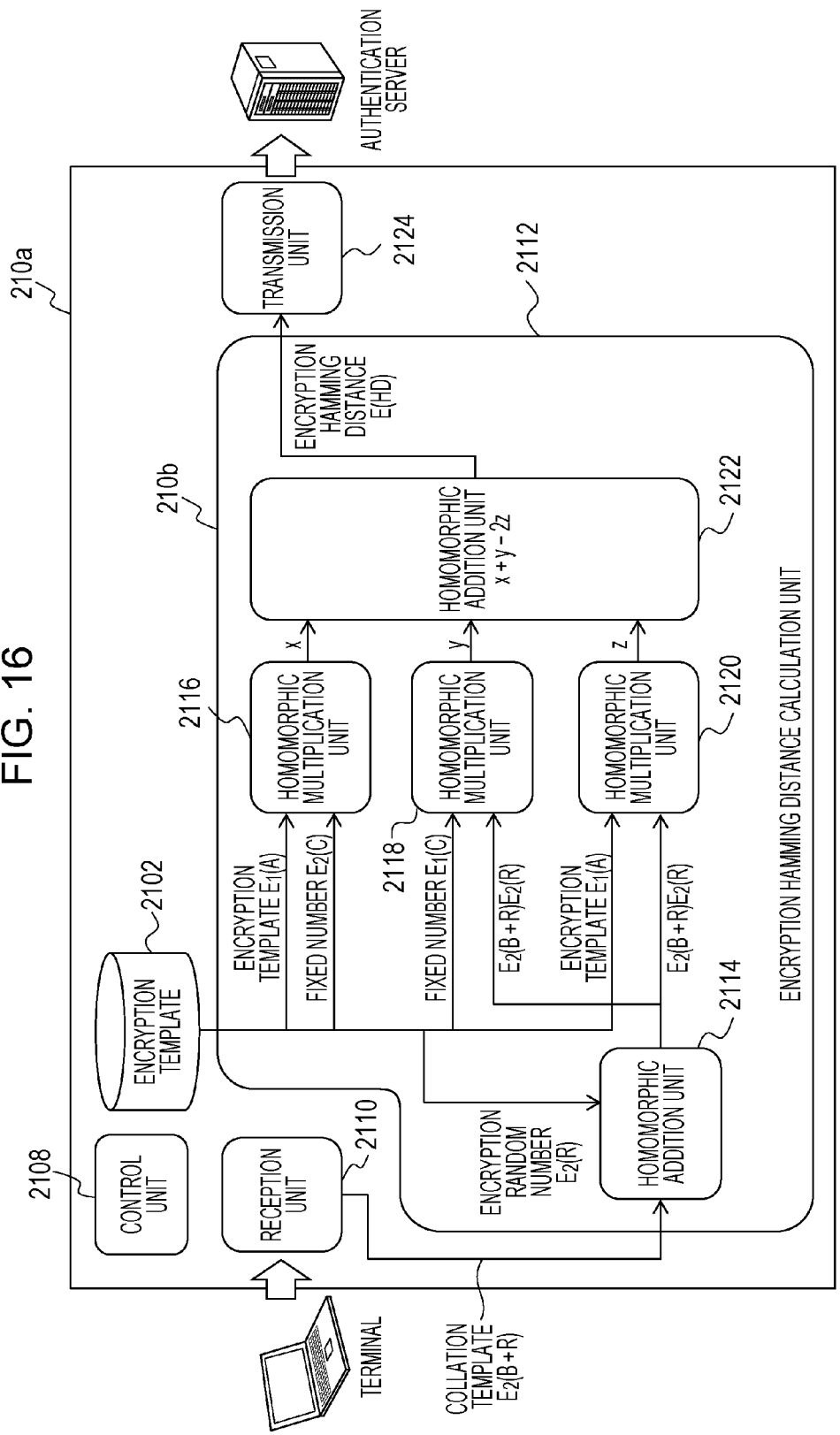

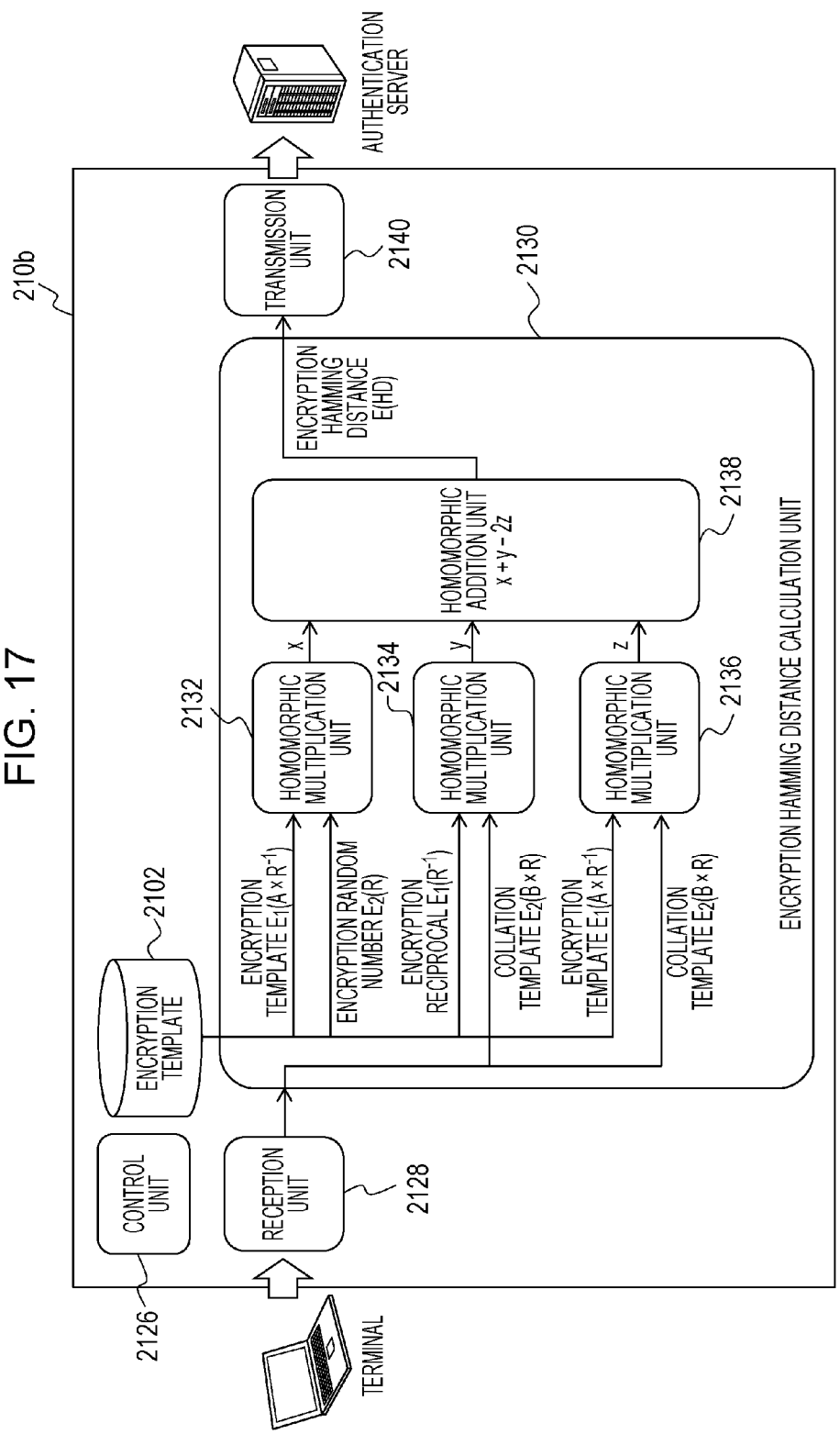

ENCRYPTION PROCESSING METHOD, ENCRYPTION PROCESSING DEVICE, AND COMPUTER-READABLE RECORDING MEDIUM STORING PROGRAM FOR ENCRYPTION PROCESSING

CROSS-REFERENCE TO RELATED APPLICATION

This application is based upon and claims the benefit of priority of the prior Japanese Patent Application No. 2014-135113, filed on Jun. 30, 2014, the entire contents of which are incorporated herein by reference.

FIELD

The embodiment discussed herein is related to an encryption processing method, an encryption processing device, and an encryption processing program.

BACKGROUND

At present, protection of personal information and confidential information has become more important, and thus service markets using such information have expanded. As such services, for example, there are services utilizing positional information of personal users acquirable from smartphones. Thus, secret technologies capable of utilizing and applying data while protecting personal information and confidential information have attracted attention. Of the secret technologies, there are technologies for using encryption technologies or statistical technologies according to data classification and service requisites.

As the secret technologies for using encryption technologies, there are homomorphic encryption technologies. A homomorphic encryption technology is one of the public key encryption schemes using a pair of different keys between encryption and decryption and is encryption having a function of operating data with the data encrypted.

When homomorphic encryption technologies are used, encrypted texts of calculation results obtained through addition or multiplication may be obtained by adding or multiplying encrypted texts without decrypting the encrypted texts. The properties of the homomorphic encryption technology are expected to be used for electronic voting and electronic cash fields or recent cloud computing fields. As homomorphic encryption schemes related to addition or multiplication, there are known RSA encryption scheme in which only multiplication is possible and Additive ElGamal encryption in which only addition is possible. In multiplicative homomorphic encryption, when encrypted texts of plain texts (messages) a and b are assumed to be E(a) and E(b), an encrypted text E(a·b) of a product a·b of the plain texts may be calculated from E(a) and E(b). In additive homomorphic encryption, when encrypted texts of plain texts a and b are assumed to be E(a) and E(b), an encrypted text E(a+b) of a sum a+b of the plain texts may be calculated from E(a) and E(b). When the homomorphic encryption schemes are used, encrypted texts of calculation results obtained through addition or multiplication may be obtained by adding or multiplying encrypted texts without description of the encrypted texts. The properties of the homomorphic encryption technologies are expected to be used for electronic voting and electronic cash fields or recent cloud computing fields.

In recent years, fully homomorphic encryption has been known as encryption that has homomorphism in regard to both of addition and multiplication (for example, C. Gentry, "Fully Homomorphic encryption using ideal lattices", STOC2009, pp. 169 to 178, 2009 and C. Gentry and S. Halevi, "Implementing Gentry's Fully-Homomorphic Encryption Scheme", EUROCRYPT 2011, LNCS 6632, pp. 129 to 148, 2011). When addition and multiplication may be executed in encrypted states, operations such as exclusive OR, logical AND, and Negation may be executed in the encrypted states. That is, fully homomorphic encryption is encryption that has homomorphism for operations executed by all logic circuits. At first, only theoretical implementation methods have been made public and practical configuring methods have not been disclosed. However, not only specific configuring examples of key generation methods but also encryption schemes expanding types of data which may be encrypted have been proposed. Further, there is somewhat homomorphic encryption capable of executing both of addition and multiplication a limited number of times. Thus, since an encryption size and a processing performance needed for the processing by this encryption scheme may be considerably less than those of the fully homomorphic encryption, more practical operations are expected.

In generally, encryption technologies are used for encryption processing systems that verify similarity between two pieces of information. An example of the encryption processing systems includes a biometric authentication system (for example, Yasuda, Yajima, Shimoyama, and Kogure, "Secret totalization of purchase histories of companies in cloud", SCIS 2012). For example, in an encryption processing system in which homomorphic encryption is applied, information does not leak and high security may be achieved since the information is encrypted and registered in a calculation server.

SUMMARY

According to an aspect of the invention, an encryption processing method executed by a computer, the encryption processing method includes converting a first vector using a first polynomial representation to acquire a first polynomial; converting an expression using a second polynomial representation to acquire a second polynomial, the expression being obtained based on a second vector and a random number corresponding to the first vector; converting the random number using at least one of the first polynomial representation and the second polynomial representation to acquire a random number polynomial; encrypting the first polynomial, the second polynomial, and the random polynomial using a homomorphic encryption scheme to acquire the encrypted first polynomial, the encrypted second polynomial, and the encrypted random polynomial; and collating the first vector and the second vector using the encrypted first polynomial, the encrypted second polynomial, and the encrypted random polynomial.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 is a diagram illustrating an example of a data format of an encryption template according to the comparative example;

FIG. 14 is a diagram illustrating a functional block of a calculation server of the biometric authentication system using the homomorphic encryption (at the time of registration) according to the embodiment;

FIG. 15A is a diagram illustrating an example of a data format of an encryption template according to the embodiment;

FIG. 15B is a diagram illustrating another example of the data format of the encryption template according to the embodiment;

FIG. 16 is a diagram illustrating an example of a functional block of the calculation server of the biometric authentication system using the homomorphic encryption (at the time of collation) according to the embodiment;

FIG. 17 is a diagram illustrating another example of the functional block of the calculation server of the biometric authentication system using the homomorphic encryption (at the time of the collation) according to the embodiment;

DESCRIPTION OF EMBODIMENTS

Figure 1:
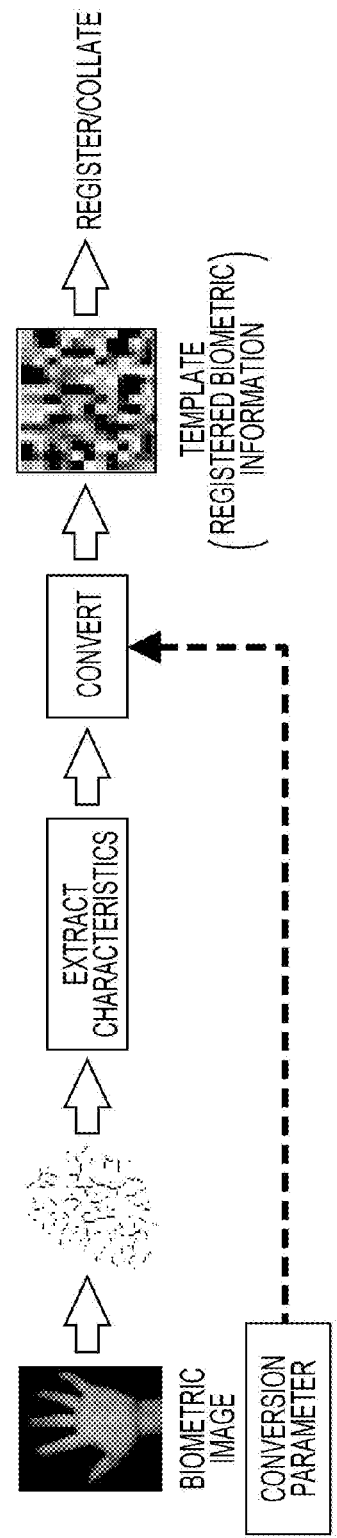
FIG. 1 is a diagram illustrating an overview of a biometric authentication system.

However, in the encryption processing system in which homomorphic encryption is applied, it is difficult for a user to simply cancel (invalidate) encrypted information without changing a key of the system when the user does not use the system. Accordingly, it is desired to simply cancel encrypted information in an encryption processing system using homomorphic encryption.

Hereinafter, a method of calculating a secure distance such as a Hamming distance using homomorphic encryption will be first described. Hereinafter, an example of ideal lattice-based homomorphic encryption will be described as the homomorphic encryption. A comparative example will be described below with reference to FIGS. 1 to 9 and an embodiment will be described below with reference to FIGS. 10 to 22.

Secure Distance Calculation Using Homomorphic Encryption

First, a somewhat homomorphic encryption scheme will be described. The somewhat homomorphic encryption to be described below is also called ideal lattice-based homomorphic encryption. This name is derived from the fact that additive homomorphism and multiplicative homomorphism are introduced using ideal lattices.

Fully homomorphic encryption refers to encryption in which homomorphism is satisfied for operations executed by all logic circuits.

The following description is entirely related to the somewhat homomorphic encryption. Examples of homomorphism include homomorphism related to addition and homomorphism related to multiplication. In the homomorphism related to addition and the homomorphism related to multiplication, for example, for arguments $m_1$ and $m_2$, mapping (function) F satisfies the following (1) or (2). That is, the following expression is satisfied.

$$F(m_1)+F(m_2)=F(m_1+m_2) \quad (1)$$

$$F(m_1) \times F(m_2)=F(m_1 \times m_2) \quad (2)$$

The case of (1) is homomorphic in regard to addition and the case of (2) is homomorphic in regard to multiplication. When plain texts are substituted for the arguments $m_1$ and $m_2$ and an encryption function Enc is substituted for the mapping F, homomorphic encryption is obtained. An operation of obtaining encrypted texts Enc $(m_1)$ and Enc $(m_2)$ from the plain texts $m_1$ and $m_2$ is called "encryption." The encrypted texts Enc $(m_1)$ and Enc $(m_2)$ are sometimes simply referred to as encrypted texts E $(m_1)$ and E $(m_2)$ when misunderstanding is not caused.

In the somewhat homomorphic encryption scheme, when Enc or simply E is assumed to be an encryption function which is a function of executing encryption using a pair of keys (pk, sk) and a public key pk of plain texts $m_1$, $m_2, \ldots, m_n$ and Dec is assumed to be a decryption function of executing decryption using a private key sk, presence and execution of the mapping F satisfying the following expression (3) are ensured.

$$Dec(F(Enc(m_1), Enc(m_2), \ldots, Enc(m_n))) = F(m_1, m_2, \ldots, m_n) \quad (3)$$

The somewhat homomorphic encryption scheme is a public key encryption scheme. Here, F is the mapping, but may be an algorithm. Further, it is assumed that the mapping F is able to be express by a combination of addition and multiplication.

The foregoing expression (3) means the following. A process of the left-hand side is called a process A and a process of the right-hand side is called a process B. The plain text $m_1$ is considered for simplicity. In an encryption step for the process A, the plain text $m_1$ is encrypted using the public key pk to obtain encrypted data $c = Enc(m_1)$. Then, a process of applying a predetermined mapping or algorithm F using the public key pk to the encrypted data c is executed to obtain a processed result r. Subsequently, in a decryption step, a process of decrypting the processed result r using the private key sk is performed to generate a decrypted result $R = Dec(F(Enc(m_1)))$.

On the other hand, in the process B, a process of applying a predetermined mapping (algorithm) F to the plain text $m_1$ is executed to obtain a processed result $R' = F(m_1)$.

The above expression means that the result $R = Dec(F(Enc(m_1)))$ of the process A is equal to the result $R' = F(m_1)$ of the process B.

Further, homomorphism in regard to the plain texts $m_1$, $m_2, \ldots, m_n$ means the following expression.

$$F(Enc(m_1), Enc(m_2), \ldots, Enc(m_n)) = Enc(F(m_1, m_2, \ldots, m_n)) \quad (4)$$

Here, on the right-hand side, note that the number of arguments of the encryption function Enc is only one, $F(m_1, m_2, \ldots, m_n)$. This encryption scheme is fully homomorphic when any F satisfies the expression (4). However, since the above-described ideal homomorphic encryption has homomorphism only for the mapping F which may be obtained by a combination of addition and multiplication a finite number of times, this encryption scheme is called somewhat homomorphic encryption. Note that in order to practically configure fully homomorphic encryption, the above-described somewhat homomorphic encryption may be modified, but the modification method is not mentioned above.

One of key generation methods is as follows.

When a key is generated, two parameters, dimension n and bit length t, may be used. In regard to the dimension n and the bit length t, an n-dimensional random number vector $v = (v_0, v_1, \ldots, v_{n-1})$ in which the absolute value of each component is an integer equal to or less than t bits is generated. At this time, the private key is assumed to be the following matrix.

$$V = \begin{bmatrix} v_0 & v_1 & v_2 & \ldots & v_{n-1} \\ -v_{n-1} & v_0 & v_1 & \ldots & v_{n-2} \\ -v_{n-2} & -v_{n-1} & v_0 & \ldots & v_{n-3} \\ \vdots & \vdots & \vdots & \ddots & \vdots \\ -v_1 & -v_2 & -v_3 & \ldots & v_0 \end{bmatrix} \quad (5)$$

A matrix B which is the Hermite normal form of the foregoing matrix V is assumed to be a public key. The Hermite normal form refers to a lower or upper triangular matrix obtained by executing a basic row operation to an integer matrix while each component in the integer matrix remains an integer. In general, it is well known that the Hermite normal form may be efficiently calculated. By using the matrix B, which is the Hermite normal form of the matrix V, as a public key, a calculation time may be shortened.

Encryption will be described. When a 1-bit plain text b is encrypted using a public key B, an n-dimensional random number vector $u = (u_0, u_1, \ldots, u_{n-1})$ in which components are 0 or 1 is first selected, and the vector a represented by the following expression (6) is generated when $e_1 = (1, 0, \ldots, 0)$ $$a = 2u + b \times e_1 = (2u_0 + b, 2u_1, \ldots, 2u_{n-1}) \quad (6)$$

The vector a obtained in this way is sometimes called a fresh encrypted text.

An encrypted text c of the 1-bit plain text b is generated as in the following expression (7).

$$c = a \bmod B = a - \lceil a \times B^{-1} \rfloor \times B \quad (7)$$

Here, $B^{-1}$ is an inverse matrix of the matrix B, "q" is a function which gives an integer value nearest to a rational number q.

When the encrypted text c of the 1-bit plain text b is decrypted, an n-dimensional vector a' defined by the following expression (8) is first calculated.

$$a' = c \bmod V = c - \lceil c \times V^{-1} \rfloor \times V \quad (8)$$

Next, a first component $a_0'$, an integer, of the n-dimensional vector a' is divided by 2 to obtain a remainder and the remainder is a value obtained by decrypting the encrypted text c.

The following method is known as another decryption method. Here, c is assumed to be the first component of the encrypted text a. Further, w is assumed to be an element of the inverse matrix $V^{-1}$ of the private key V and is an odd number. Further, the following expression (9) is introduced which gives a range of $[-d/2, d/2)$.

$$[x]_d = x \bmod d \quad (9)$$

The following expression (10) defines the encrypted text c, where d is a discriminant of the public key B.

$$c = [c \times w]_d \bmod 2 \quad (10)$$

When the encrypted text c is decrypted using the private key V, a 4-dimensional vector a' defined by (9) is first calculated. Next, a first component $a_0'$, an integer, of the n-dimensional vector a' is divided by 2 to obtain a remainder. The reminder is a value obtained by decrypting the encrypted text c.

The case in which the plain text b is 1 bit has been described above, and the domain of definition for the plain text may be expanded. The plain text b is selected from $\{0, 1, \ldots, s-1\}$, that is, even when the size of a plain text space is s, the encryption and the decryption may be executed in this way.

When the plain text b with a size equal to or less than the size s of the plain text space is encrypted using the public key B, the n-dimensional random number vector $u = (u_0, u_1, \ldots, u_{n-1})$ in which components are 0 or 1 is first selected, and the vector a expressed by the following expression (11) is generated when $e_1 = (1, 0, \ldots, 0)$.

$$a = su + b \times e_1 = (su_0 + b, su_1, \ldots, su_{n-1}) \quad (11)$$

The vector a is also sometimes called a fresh encrypted text. The encrypted text c of the plain text b is given by the following expression (12), as in the foregoing (8).

$$c = a \bmod B = a - \text{``}a \times B^{-1}\text{''} \times B \qquad (12)$$

Here, the encrypted text c is an integer since the vector $c=(c, 0, \ldots, 0)$.

When the encrypted text c of the plain text b is decrypted, an n-dimensional vector a' defined by the following expression (13) is calculated.

$$a' = c \bmod V = c - \text{``}c \times V^{-1}\text{''} \times V \qquad (13)$$

Next, a first component $a_0'$, an integer, of the n-dimensional vector a' is divided by the size s of the plain text space to obtain a reminder. The reminder is a value obtained by decrypting the encrypted text c. In the decryption process, a process of multiplying the vector c by the matrix $V^{-1}$ and a process of multiplying the vector obtained through the multiplication by the matrix V are performed. That is, a product of the vector and the matrix is calculated twice. The number of multiplications at this time is $2 \times D^2$ which is proportion to the number of components D of the vector. When data to be treated is large, the single multiplication is multiple-length multiplication.

Addition and multiplication of encrypted data will be described. As in the foregoing numerical value examples, the encrypted text is surely expressed as the n-dimensional vector $c=(c_1, 0, \ldots)$ in which components are 0 except for the first component. The integer of the first component of the encrypted text may also be calculated and expressed as the following expression (14) using the n-dimensional vector $u=(u_0, u_1, \ldots, u_{n-1})$ in which the plain text b and the size s of the plain text space are used for the encryption.

$$c_1 = [b + s \Sigma_{i=0}^{n-1} u_i \times r^i]_d \qquad (14)$$

Here, $[x]_d$ is the following expression (15) which is equal to an integer given by $[-d/2, d/2)$.

$$[x]_d = x \bmod d \qquad (15)$$

Further, d is the component (1, 1) of the matrix B indicating the public key, and r is a component (2, 1) of the matrix B indicating the public key. Thus, the encrypted text may be considered as integer data.

For two encrypted texts $c_1$ and $c_2$, encryption addition is defined as $[c_1+c_2]_d$ and encryption multiplication is defined as $[c_1 \times c_2]_d$.

In order to apply the properties of the above-described homomorphic encryption to comparison of two pieces of vector data, for example, the following may be executed.

Vector data $A=(a_1, a_2, \ldots, a_n)$ and vector data $B=(b_1, b_2, \ldots, b_n)$ are assumed to be present. Here, the vector data A and the vector data B are assumed to be written as n-dimensional vector amounts.

For the vector data $A=(a_1, a_2, \ldots, a_n)$, a polynomial representation expressed by the following expression (16), is calculated.

$$a(x) = \Sigma_{i=1}^{n} a_i x^{i-1} \qquad (16)$$

Thus, in the polynomial representation a(x), the components of the vector data A are arranged in an ascending order of power. Then, the polynomial representation a(x) is encrypted and encrypted data Enc(a(x)) is calculated. In the current case, the following expression is assumed.

$$\text{Enc}(a(x)) = [a(r) + s \times \Sigma_{i=0}^{n-1} u_i \times r^{i-1}]_d \qquad (17)$$

For the vector data $B=(b_1, b_2, \ldots, b_n)$, a polynomial representation expressed by the following expression (18) is calculated.

$$b(x) = \Sigma_{j=1}^{n} b_j x^{n-j+1} \qquad (18)$$

Thus, in the polynomial representation b(x), the components of the vector data B are arranged in a descending order of power. Then, the polynomial representation b(x) is encrypted and encrypted data Enc(b(x)) is calculated. The polynomial representation for the vector data $B=(b_1, b_2, \ldots, b_n)$ is different from the polynomial representation for the vector data $A=(a_1, a_2, \ldots, a_n)$.

[Secure Distance Calculation Using Homomorphic Encryption]

Next, two integers $C_1$ and $C_2$ are prepared in advance in order to calculate a secure distance. The two integers $C_1$ and $C_2$ are defined in the following expressions (19).

$$C_1 = \left[ -\sum_{i=1}^{n} r^{n-i+1} \right]_d \qquad (19)$$

$$C_2 = \left[ -\sum_{j=1}^{n} r^{j-1} \right]_d$$

The secure distance d is the following expression (20).

$$d = C_1 \times \text{Enc}(a(x)) + C_2 \times \text{Enc}(b(x)) + 2\text{Enc}(a(x)) \times \text{Enc}(b(x)) \qquad (20)$$

In (21), $C_1 \times \text{Enc}(a(x))$ and $C_2 \times \text{Enc}(b(x))$ correspond to Hamming weights HW(a) and HW(b) in the encrypted text. When the secure distance d is decrypted, the Hamming distance between two pieces of vector data $A=(a_1, a_2, \ldots, a_n)$ and vector data $B=(b_1, b_2, \ldots, b_n)$ are obtained. The Hamming distance is used as the secure distance, as described above. The disclosed method may also be applied to distance calculation of a Euclidean distance or the like or calculation of cosine similarity or the like.

In addition to the calculation expressions using (19) and (20), there is the following calculation.

For example, using the polynomial representation b' and the integer $C'_2$ expressed as the following expressions (21) and (22), the secure distance d is calculated by the following expression (23).

$$b' = [-\Sigma_{i=1}^{n} b_i r^{n-i+1}]_d \qquad (21)$$

$$C'_2 = [-\Sigma_{j=1}^{n} r^{j-1}]_d \qquad (22)$$

For the above expression, the secure distance d may be obtained by the following expression (23).

$$d = C_1 \times \text{Enc}(a(x)) + C'_2 \times \text{Enc}(b'(x)) - 2\text{Enc}(a(x)) \times \text{Enc}(b'(x)) \qquad (23)$$

$$= C_2 \times (-\text{Enc}(a(x)) + \text{Enc}(b'(x)) + 2\text{Enc}(a(x)) \times (1 - \text{Enc}(b'(x))))$$

As described above, to generate an encryption key, three key generation parameters (n, q, t) are mainly necessary. Here, n is an integer of a power of two expressed as the form $2^m$ where m is an integer and is called a lattice dimension, q is assumed to be a prime number, and t is assumed to be an integer less than the prime number q. In a generation order of the encryption key, an n-degree polynomial sk with very small coefficients is first generated at random as a private key, where the smallness of each coefficient may be restricted with a certain parameter σ. Next, an n-degree polynomial $a_1$ with coefficients which are smaller than q and an n-degree polynomial e with very small coefficients are generated at random. Thus, $a_0=-(a_1 \times sk+t \times e)$ is calculated and a pair $(a_0, a_1)$ is defined as a public key pk. In the calculation for the polynomial $a_0$, when a polynomial is of degree equal to or higher than n, terms of degree equal to or higher than n are converted to $x^n=-1$, $x^{n+1}=-x$, or the like to calculate a polynomial of degree smaller than n. Further, when calculating coefficients of the polynomial, a remainder obtained by dividing the coefficient of the polynomial by the prime number q is output. A space in which the calculations are executed is sometimes expressed as $Rq=Fq[x]/(x^n+1))$. Next, for a public key $pk=(a_0, a_1)$ and plain data m expressed in an n-degree polynomial in which each coefficient is less than t, and three n-degree polynomials u, f, and g in which each coefficient is very small are first generated at random and encrypted data $Enc(m, pk)=(c_0, c_1)$ of plain text data m is defined as follows. Here, $(c_0, c_1)$ are calculated by the following expressions (24) and (25)

$$c_0 = a_0 \times u + t \times g + m \quad (24)$$

$$c_1 = a_1 \times u + t \times f \quad (25)$$

These calculations are performed also on the space Rq. Next, for two encrypted texts $Enc(m_1, pk)=(c_0, c_1)$ and $Enc(m_2, pk)=(d_0, d_1)$, encryption addition $Enc(m_1, pk)+Enc(m_2, pk)$ is calculated to $(c_0+d_0, c_1+d_1)$ and encryption multiplication $Enc(m_1, pk)+Enc(m_2, pk)$ is calculated to $(c_0+d_0, c_0 \times d_1+c_1 \times d_0, c_1 \times d_1)$. Here, when the encryption multiplication is executed, the data size of the encrypted text becomes a 3-component vector from a 2-component vector.

Finally, for the decryption process, when components of the encrypted data increase through encryption operations such as a plurality of encryption multiplications, decryption may be performed by calculating $Dec(c, s)=[c_0+c_1 \times sk+c_2 \times sk2+\ldots]_q \mod t$ using the private key sk for an encrypted text $c=(c_1, c_2, c_3, \ldots)$. Here, $[z]_q$ means the calculation for obtaining a remainder w by dividing an integer z by q and further $[z]_q$ gives w when w<q, otherwise, $[z]_q$ gives w−q. Further, a mod t means a remainder obtained by dividing an integer a by t.

As described above, the disclosure method has the following characteristics:

(1) using the lattice-based homomorphic encryption;

(2) converting a vector representing a characteristic amount into a polynomial with a polynomial representation;

(3) using an encrypted text of a polynomial representation and an encrypted text of a weight such as a Hamming weight or the like of the vector; and (4) using homomorphism in regard to a polynomial operation of homomorphic encryption as secure distance calculation.

Thus, by using the homomorphic encryption for the calculation of a secure distance such as a Hamming distance, the size of the encrypted data and the calculation time may be considerably reduced.

The above-described ideal lattice-based homomorphic encryption and decryption may also be described as follows.

First, terms will be defined in brief.

A lattice is a discrete additive subgroup in $z^n$ when Z is a ring of integer. When $b_0, \ldots, b_{n-1}$ are linearly independent in $z^n$, a square matrix $B=[b_0, \ldots, b_{n-1}]$ generated by arranging these components $b_0, \ldots, b_{n-1}$ is called a base. The lattice L may be represented as the following expression when v is an element of $Z^n$.

$$b'(x) = -\sum_{j=1}^{n} b_j x^{n-j+1}, \quad (24)$$

$$C_2' = \left[-\sum_{j=1}^{n} r^{j-1}\right]_d$$

The fact that the lattice L is an ideal lattice means that there is an ideal I of a ring $R=Z[x]/f(x)$ isomorphic to the lattice L. Here, $Z[x]$ is a polynomial ring with integer coefficients, and $f(x)$ is an n-degree monic polynomial with integer coefficients.

A principal ideal element generated by one element of a residue ring R, in the following expression (27), may be represented as a linear combination of a, $a \cdot x$, $a \cdot x^2$, and $a \cdot x^{n-1}$.

$$a = a_0 + a_1 x + a_2 \cdot x^2 + \ldots + a_{n-1} x^{n-1} \mod f(x) \quad (27)$$

A transposition of a is represented as $a^T$.

Supposing $f(x)=x^n+1$, a monic polynomial with integer coefficients of the ring $R=Z[x]/(x^n+1)$: $a(x)=a_0+a_1x+\ldots+a_{n-1}x^{n-1}$ is considered. To identify the vector $a=(a_0, a_1, \ldots, a_{n-1})$ with the ring $R=Z[x]/(x^n+1)$, a process is executed as follows, where a circulant matrix for a is defined as the following expression (28).

$$Rot(a) = \begin{bmatrix} a_0 & a_1 & a_2 & \ldots & a_{n-1} \\ -a_{n-1} & a_0 & a_1 & \ldots & a_{n-2} \\ -a_{n-2} & -a_{n-1} & a_0 & \ldots & a_{n-3} \\ \vdots & \vdots & \vdots & \ddots & \vdots \\ -a_1 & -a_2 & -a_3 & \ldots & a_0 \end{bmatrix} \quad (28)$$

This expression is identical to (5). Then, for the two polynomials $a(x)$ and $b(x)$, a product may be defined by $a(x) \cdot b(x) = Rot(a) \cdot b$. Further, the circulant matrix Rot(a) becomes a basic matrix.

Then, key generation in the above-described lattice-based homomorphic encryption method is understood follows. That is, a basic matrix of an ideal J, which is mutually prime to an ideal I of the ring $R=Z[x]/(x^n+1)$, is the private key V, and the public key B is the Hermite normal form of the basic matrix. For example, the private key may be defined as a matrix represented by $n^{1/2}$ I+R when R is a random matrix having a small norm.

At this time, in the encryption, the encrypted text of the plain text b is set as the first component of $c=b+rs \mod B$ and r is selected from R. When the norm of the plain text b is small, the decryption may be performed with $b=(c \mod B) \mod I$.

By calculating a secure distance such as a Hamming distance using the above-described lattice-based somewhat homomorphic encryption, both of the size of the encrypted vector data and the time for the calculation of the secure distance may be reduced.

In the above-described homomorphic calculation, one of a Ring-LWE base and an ideal lattice may be used.

The above-described homomorphic encryption scheme may be applicable only to a biometric authentication system but also to a tag retrieval or search system and the like.

Comparative Example

FIG. 1 is a diagram illustrating an overview of a biometric authentication system which is an example of an encryption processing device.

One of an application example of the homomorphic encryption scheme is an application to a secret biometric authentication system. The secret biometric authentication system using homomorphic encryption will be described with reference to FIG. 1. This system is a personal authentication system that uses biometric information such as a fingerprint or a vein. A personal authentication system using biometric information may not store complicated information such as a password, and thus utilizes a personal authentication scheme which is easy to use. In contrast, since the biometric information is confidential information which is invariant for the life of each user, there is a problem that it is desirable to protect the biometric information strongly against leakage.

Figure 2:
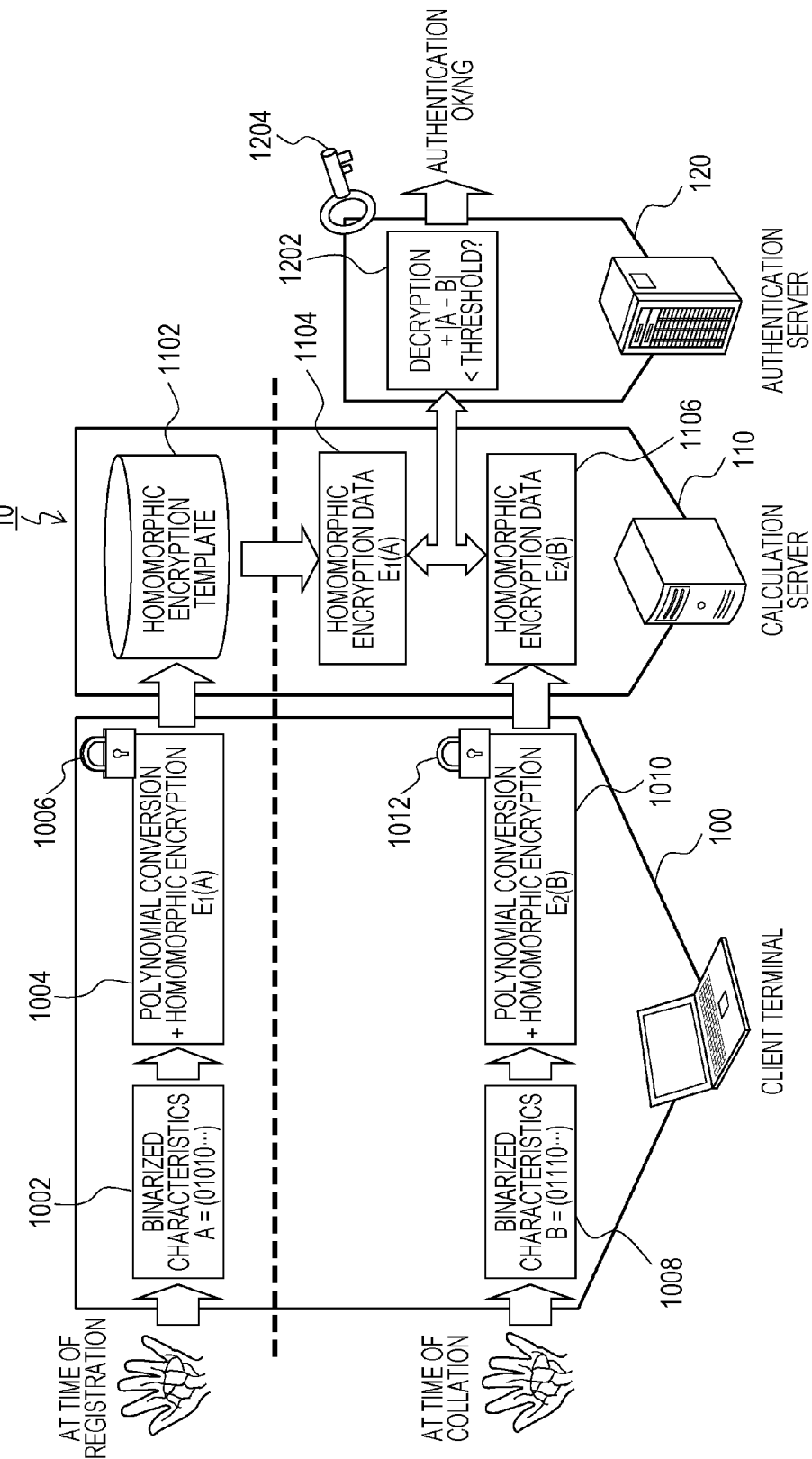
FIG. 2 is a diagram illustrating an overview of a biometric authentication system using homomorphic encryption according to a comparative example.

FIG. 2 is a diagram illustrating an overview of a biometric authentication system using homomorphic encryption according to a comparative example.

A biometric authentication system 10 illustrated in FIG. 2 utilizes a scheme capable of performing authentication while protecting biometric information regarding a user through homomorphic encryption. The system 10 includes a client terminal 100 (hereinafter, the client terminal is sometimes simply referred to as a terminal), a calculation server 110, and an authentication server 120.

At the time of registration of biometric information, in the biometric authentication system 10, the user inputs the biometric information such as a fingerprint or a vein to the terminal 100. A binarization unit 1002 of the terminal 100 extracts a characteristic amount and vectorizes the biometric information to obtain vector A. An encryption unit 1004 performs polynomial conversion and homomorphic encryption on vector A. Hereinafter, for example, the vector A obtained by performing the polynomial conversion with polynomial 1 (for example, a(x) of (16)) and performing the homomorphic encryption is represented as $E_1(A)$. As another example, vector B obtained by performing the polynomial conversion with polynomial 2 (for example, b(x) of (18)) and performing the homomorphic encryption is represented as $E_2(B)$. When the encryption unit 1004 performs the encryption, a public key 1006 is used. Even in registration, an encryption unit 1012 sometimes performs encryption by using a public key 1012. The terminal 100 transmits the biometric information $E_1(A)$ subjected to the homomorphic encryption to the calculation server 110, and then the calculation server 110 registers the biometric information subjected to the homomorphic encryption in a database (homomorphic encryption template) 1102. At this time, $E_1(C)$ and $E_2(C)$ may be registered along with the biometric information $E_1(A)$ in the database (homomorphic encryption template) 1102.

At the time of collation, the user inputs the biometric information to the terminal 100 and a binarization unit 1008 vectorizes the biometric information to obtain vector B. An encryption unit 1010 performs polynomial conversion and homomorphic encryption on vector B. When the encryption unit 1010 performs the encryption, the public key 1012 is used. The terminal 100 transmits the data $E_2(B)$ obtained by performing the homomorphic encryption on the vectorized biometric information to the calculation server 110, and then the calculation server 110 calculates a secure distance between the homomorphic encryption data 1104 ($E_1(A)$) and homomorphic encryption data 1116 ($E_2(B)$) with reference to data (homomorphic encryption template) stored in the database 1102. Then, the calculation server 110 transmits only a secure distance calculation result to the authentication server 120 having a private key 1204 of the homomorphic encryption. A comparison unit 1202 of the authentication server 120 decrypts the received secure distance calculation result and compares the decrypted result to a threshold. When the decrypted result is less than the threshold, the user is authenticated.

In the biometric authentication system 10, Hamming distance calculation is used when two pieces of biometric vector data are compared. As a secure distance calculation process of the secret biometric authentication system 10 illustrated in FIG. 2, two pieces of vector data are subjected to homomorphic encryption, and a Hamming distance is calculated in this state. In the secret biometric authentication system 10 in FIG. 2, only homomorphic encryption biometric vector information is transmitted to the calculation server 110. Thus, since the calculation server 110 has no private key, the biometric information regarding the user may not be known. Since an authentication authority also decrypts only the secure distance calculation result, the biometric information (vectorized biometric information) regarding the user may not be known. Thus, unless both of the authentication server 120 having a private key and the calculation server 110 conspire, a personal authentication service may be received with the biometric information regarding the user protected.

The biometric authentication system 10 according to the comparative example will be described in more detail with reference to FIGS. 3 to 7.

Figure 3:
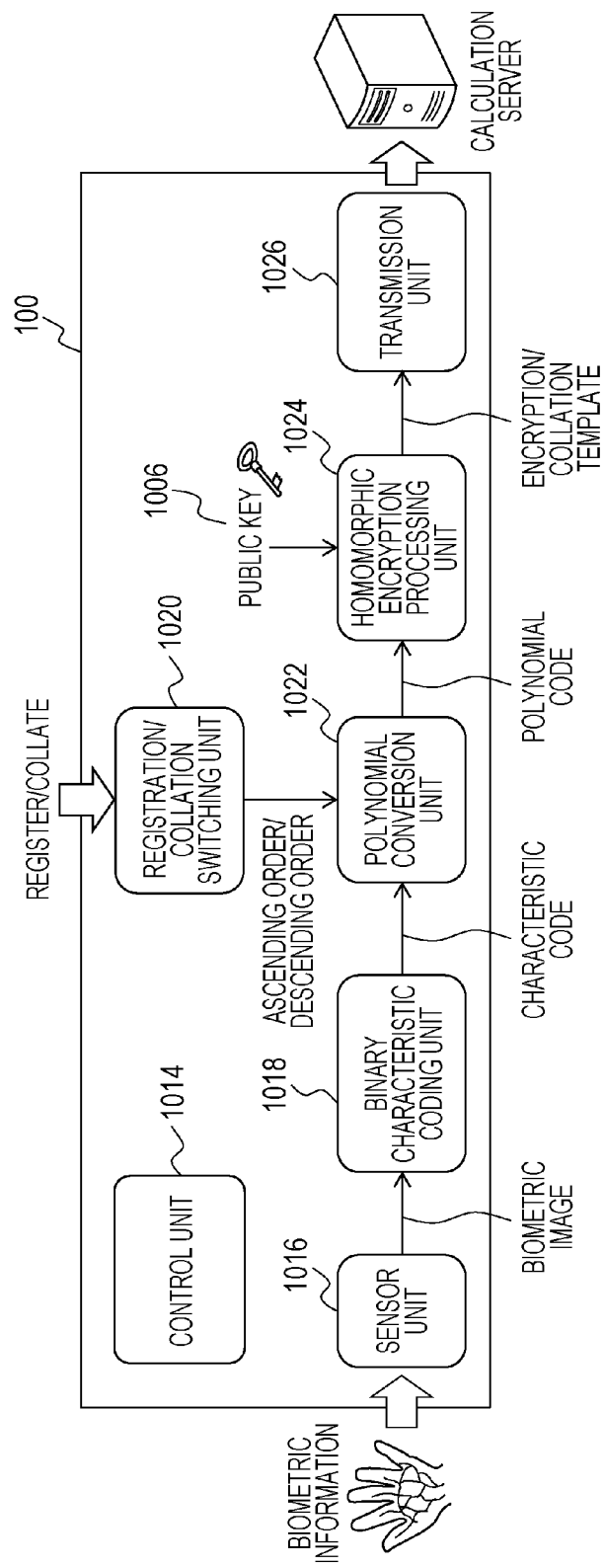
FIG. 3 is a diagram illustrating an example of a functional block of a terminal of the biometric authentication system using the homomorphic encryption according to the comparative example.

FIG. 3 is a diagram illustrating an example of a functional block of the terminal of the biometric authentication system using the homomorphic encryption according to the comparative example.

A sensor unit 1016 of the terminal 100 of the biometric authentication system acquires a biometric image of the user.

For example, a binary characteristic coding unit 1018 binarizes the biometric image acquired by the sensor unit 1016 to generate a characteristic code.

A polynomial conversion unit 1022 performs polynomial conversion on the characteristic code and outputs a polynomial code depending on a command which is input from the outside to a registration/collation switching unit 1020 and discriminates the time of registration from the time of collation.

A homomorphic encryption processing unit 1024 encrypts the polynomial code using the public key 1006. The homomorphic encryption processing unit 1024 outputs encryption template/encryption collation data to transmit the encryption template/encryption collation data from a transmission unit 1026.

The sensor unit 1016, the binary characteristic coding unit 1018, the polynomial conversion unit 1022, the homomorphic encryption processing unit 1024, and the transmission unit 1026 may be controlled by the control unit 1014.

Figure 4:
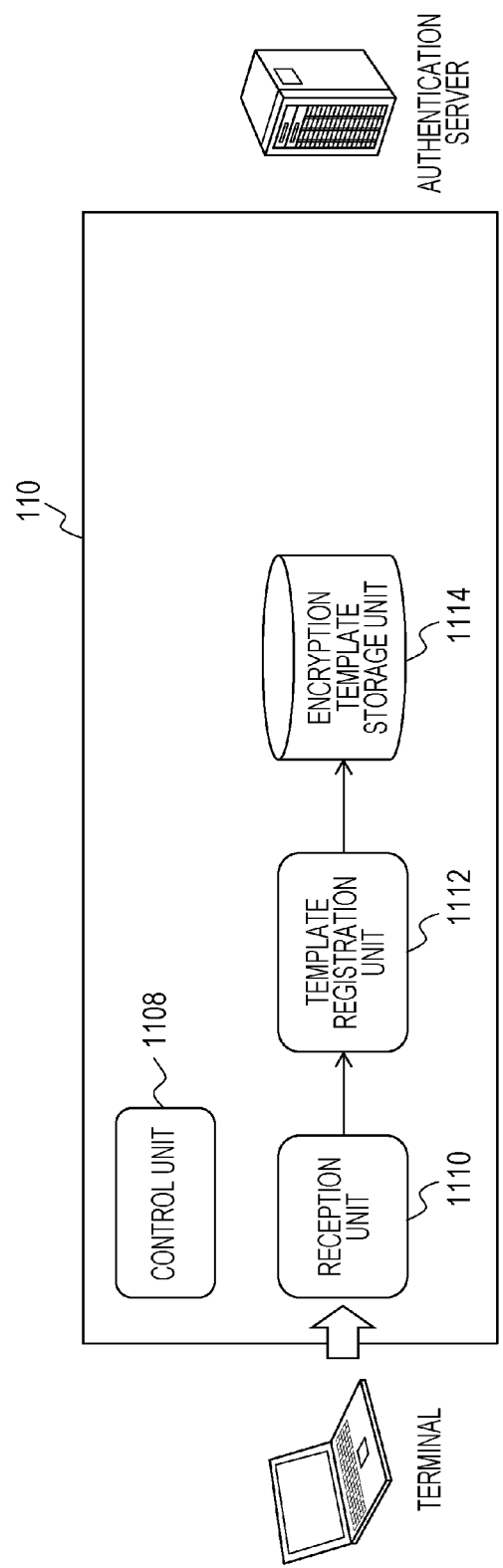
FIG. 4 is a diagram illustrating an example of a functional block of a calculation server of the biometric authentication system using the homomorphic encryption (at the time of registration) according to the comparative example.

FIG. 4 is a diagram illustrating an example of a functional block of the calculation server 110 of the biometric authentication system using the homomorphic encryption (at the time of registration) according to the comparative example.

A reception unit 1110 receives an encryption template from the terminal 100. A template registration unit 1112 stores the encryption template in a database 1114 storing the encryption template.

FIG. 5 is a diagram illustrating an example of a data format of an encryption template according to the comparative example. An encryption template 116 includes a user ID and encryption templates $E_1(A)$, $E_1(C)$, and $E_2(C)$.

Figure 6:
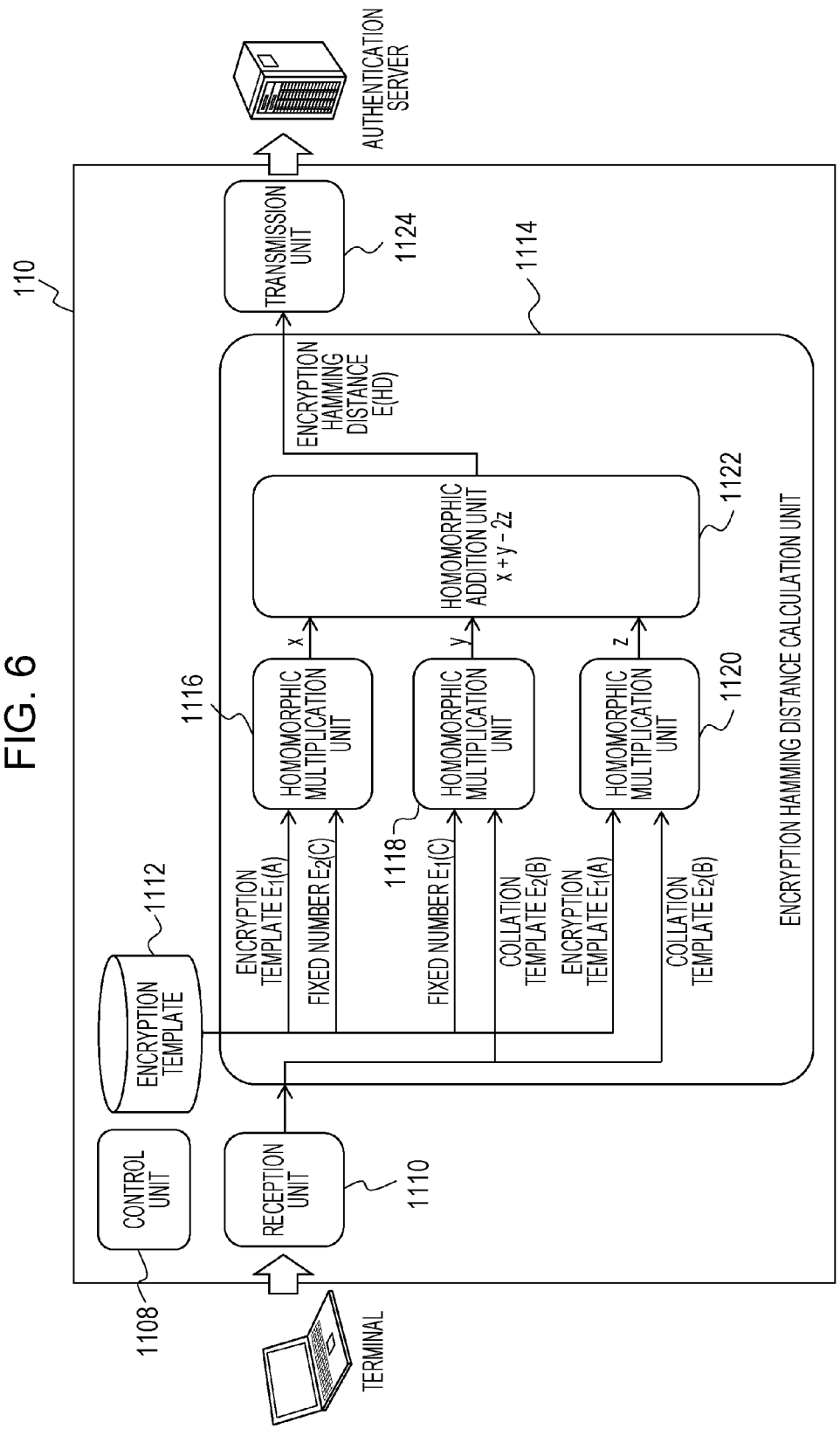
FIG. 6 is a diagram illustrating an example of a functional block of the calculation server of the biometric authentication system using the homomorphic encryption (at the time of collation) according to the comparative example.

FIG. 6 is a diagram illustrating an example of a functional block of the calculation server 110 of the biometric authentication system using the homomorphic encryption (at the time of collation) according to the comparative example.

A reception unit 1110 receives the encryption collation data from the terminal. The encryption collation data includes, for example, the user ID and encryption collation data $E_2(B)$.

A homomorphic multiplication unit 1116 calculates multiplication $x=E_1(A)\times E_2(C)$ of both $E_2(C)$ and $E_1(A)$ using a fixed number $E_2(C)$ and $E_1(A)$ from an encryption template storage unit 1112.

A homomorphic multiplication unit 1118 calculates multiplication $y=E_1(C)\times E_2(B)$ of both $E_1(C)$ and $E_2(B)$ using the fixed number $E_1(C)$ and $E_2(B)$ from the encryption collation data.

A homomorphic multiplication unit 1120 calculates multiplication $z=E_1(A)\times E_2(B)$ of both $E_2(B)$ and $E_1(A)$ using $E_2(B)$ from the encryption collation data and $E_1(A)$ from the encryption template storage unit 1112.

A homomorphic addition unit 1122 calculates an encryption Hamming distance $E(HD)=x+y-2z$ using the outputs x, y, and z from the homomorphic multiplication unit 1116, the homomorphic multiplication unit 1118, and the homomorphic multiplication unit 1120.

The homomorphic multiplication unit 1116, the homomorphic multiplication unit 1118, the homomorphic multiplication unit 1120, and the homomorphic addition unit 1122 are combined to configure an encryption Hamming distance calculation unit 1114. A transmission unit 1124 transmits the encryption Hamming distance $E(HD)$.

Figure 7:
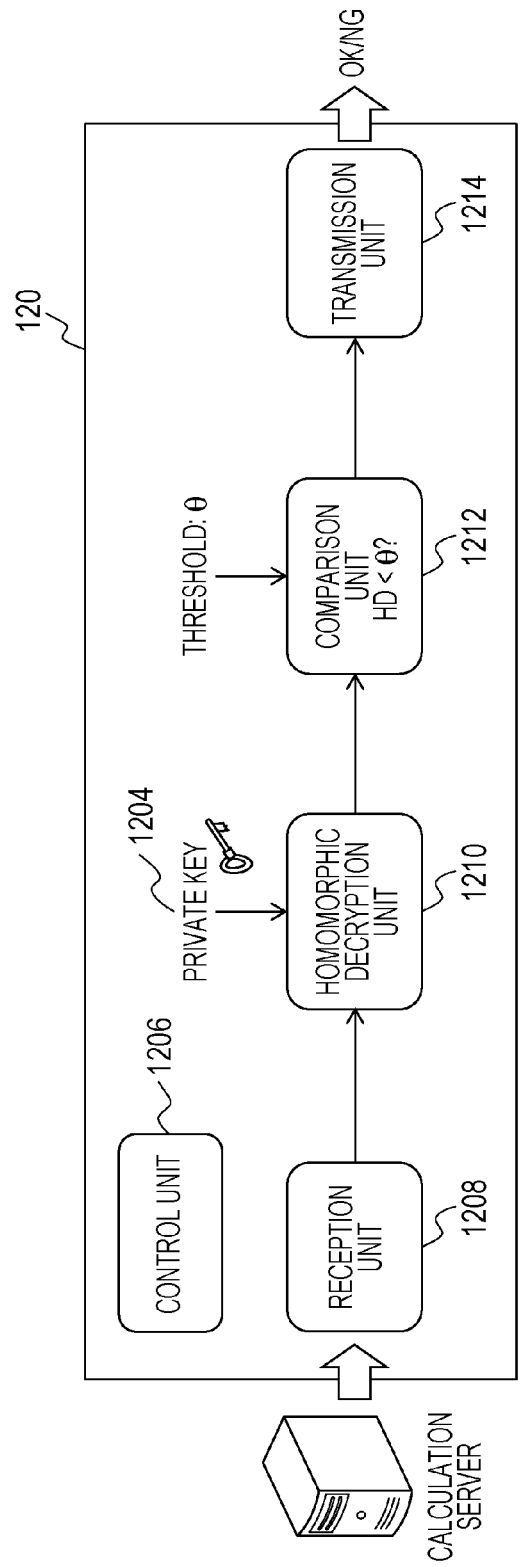
FIG. 7 is a diagram illustrating an example of the functional block of an authentication server of the biometric authentication system using the homomorphic encryption according to the comparative example.

FIG. 7 is a diagram illustrating an example of the functional block of the authentication server 120 of the biometric authentication system using the homomorphic encryption according to the comparative example.

A reception unit 1208 of the authentication server 120 receives the encryption Hamming distance $E(HD)$ from the calculation server 110. A homomorphic decryption unit 1210 decrypts the encryption Hamming distance $E(HD)$ using the private key 1204 to obtain a Hamming distance HD.

A comparison unit 1212 compares the Hamming distance HD to a pre-given threshold θ. When the Hamming distance HD is less than the threshold θ, the user is authenticated (OK). Otherwise, the user is not authenticated (NG). A transmission unit 1214 transmits the comparison result (OK or NG) of the comparison unit 1212.

Figure 8:
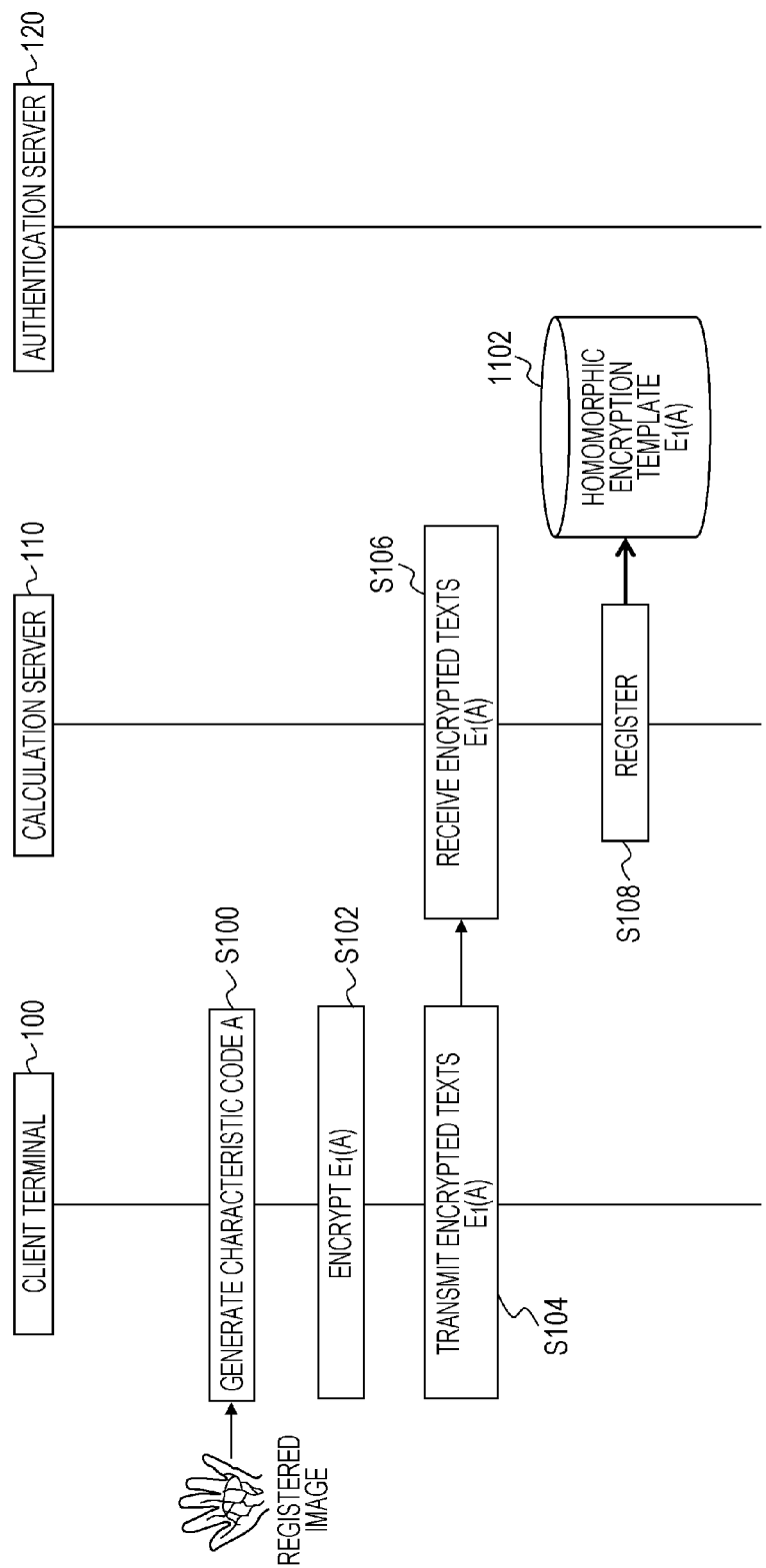
FIG. 8 is a diagram illustrating an example of the flow of a process at the time of the registration in a biometric authentication method using the homomorphic encryption according to the comparative example.

FIG. 8 is a diagram illustrating an example of the flow of a process at the time of the registration in a biometric authentication method using the homomorphic encryption according to the comparative example.

When the process starts, the binarization unit 1002 of the client terminal 100 generates a characteristic code A using a registered image registered for biometric authentication in S100.

Next, in S102, the encryption unit 1004 of the terminal 100 encrypts the characteristic code A to obtain an encrypted text $E_1(A)$. When the process of S102 ends, the process proceeds to S104.

In S104, the transmission unit 1026 of the terminal 100 transmits the encrypted text $E_1(A)$. When the process of S104 ends, the process proceeds to S106.

In S106, the reception unit 1110 of the calculation server 110 receives the encrypted text $E_1(A)$. When the process of S106 ends, the process proceeds to S108.

In S108, the template registration unit 1112 of the calculation server 110 stores the encrypted text $E_1(A)$ in the database 1102.

Figure 9:
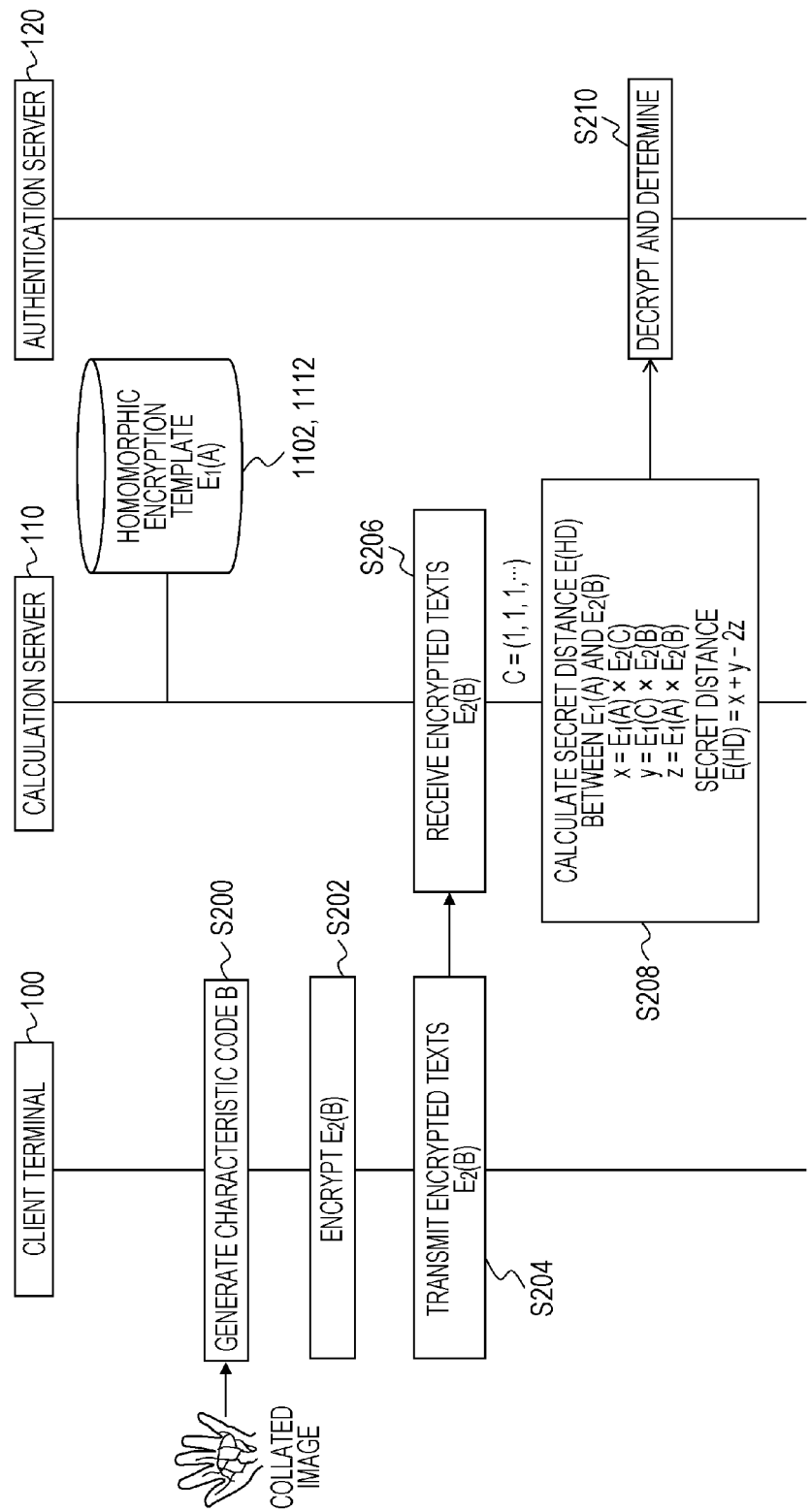
FIG. 9 is a diagram illustrating an example of the flow of a process at the time of the collation in the biometric authentication method using the homomorphic encryption according to the comparative example.

FIG. 9 is a diagram illustrating an example of the flow of a process at the time of the collation in the biometric authentication method using the homomorphic encryption according to the comparative example.

When the process starts, the binarization unit 1008 of the client terminal 100 generates a characteristic code B using a collated image used for collation in S200.

Next, in S202, the encryption unit 1010 of the terminal 100 encrypts the characteristic code B to obtain an encrypted text $E_2(B)$. When the process of S202 ends, the process proceeds to S204. In S204, the transmission unit 1026 of the terminal 100 transmits the encrypted text $E_2(B)$. When the process of S204 ends, the process proceeds to S206. In S206, the reception unit 1110 of the calculation server 110 receives the encrypted text $E_2(B)$. When the process of S206 ends, the process proceeds to S208.

In S208, the encryption Hamming distance calculation unit 1114 of the calculation server 110 calculates the secure distance $E(HD)$ between $E_1(A)$ and $E_2(B)$. An encryption Hamming distance $E(HD)=x+y-2z$ is calculated using $x=E_1(A)\times E_2(C)$ obtained by the homomorphic multiplication unit 1116, $y=E_1(C)\times E_2(B)$ obtained by the homomorphic multiplication unit 1118, and $z=E_1(A)\times E_2(B)$ obtained by the homomorphic multiplication unit 1120. At this time, the encryption template $E_1(A)$ stored in the database 1102 is referred to.

In S208, the transmission unit 1124 of the calculation server 110 transmits the encryption Hamming distance $E(HD)$. When the process of S208 ends, the process proceeds to S210. In S210, the authentication server 120 decrypts the encryption Hamming distance $E(HD)$ and compares the Hamming distance HD to the pre-given threshold θ. When the Hamming distance HD is less than the threshold θ, the user is authenticated (OK). Otherwise, the user is not authenticated (NG).

Since the biometric information is encrypted and registered in the calculation server in the secret biometric authentication system 10, the biometric information does not leak, and thus may be said to be secure. However, when the user does not use the system 10 anymore, the user may not simply cancel the encrypted biometric information without changing the key of the system.

In an embodiment to be described below, the secret biometric authentication system using the homomorphic encryption realizes a process of cancelling the encrypted biometric information registered by the user without a considerable increase in a processing load on the calculation server.

Embodiment

Hereinafter, an encryption processing device (biometric authentication system) according to the embodiment will be described with reference to FIGS. 10 to 22. A result obtained by polynomializing plain text A with polynomial 1, and then performing homomorphic encryption is sometimes denoted by $E_1(A)$ below. The biometric authentication system will be mainly described below, but application to a tag retrieval or search system or the like is possible as well as the biometric authentication system.

The encryption processing device (biometric authentication system) according to the embodiment masks a template or collation data with a random number stored by a user, doubly encrypts the masked template or collation data with homomorphic encryption, and transmits the encrypted template or collation data. The encryption processing device according to the embodiment performs a collation process on the doubly encrypted template or collation data and the user may change a mask for cancelling the mask through the collation process. Thus, the biometric information registered by the user may be cancelled (invalidated).

The above-described homomorphic encryption scheme is also used below. A case will be considered in which vector data $A=(a_0, a_1, \ldots)$ indicating biometric information for registration and vector data $B=(b_0, b_1, \ldots)$ indicating biometric information at the time of the collation are encrypted and a secure distance is calculated. In this example, a Hamming distance is used as the secure distance, but other distances may be used.

First, a method called an additive mask will be described.

In this case, a random number vector $R=(r_0, r_1, \ldots)$ which is unique to a user, secret, and cryptographically secure is generated. The random number vector R is sometimes simply called a random number. Subsequently, A and R are polynomialized in two types and are encrypted by homomorphic encryption E using the public key pk to calculate encrypted texts $E_1(R)$ and $E_2(R)$. The polynomialization and the homomorphic encryption described above may be used. In the two type of polynomialization, a first polynomial representation is used to arrange elements of a first vector in an ascending order of power and a second polynomial representation is used to arrange elements of a second vector in a descending order of power, or the first polynomial representation is used to arrange the elements of the first vector in the descending order of power and the second polynomial representation is used to arrange the elements of the second vector in the ascending order of power. The foregoing (16) and (18) are examples of the pair of polynomials. The random number (random number vector) R may be stored in a memory such as a non-volatile memory. Here, the random number R is assumed to be rewritable from the outside. Likewise, for vector B, an encrypted text $E_2(B+R)$ using the homomorphic encryption for the random number R and the public key pk is calculated. From the properties of the homomorphic encryption, an encrypted text of the Hamming distance HD (A, B) between two plain text vectors may be generated from two encrypted texts, the encrypted text of the Hamming distance HD (A, B) is expressed by the following expression (29).

$$E(HD)=E_1(A) \times E_2(R)+E_1(R) \times (E_2(B+R)-E_2(R))-2E_1(A) \times (E_2(B+R)-E_2(R)) \quad (29)$$

Here, the user may cancel encryption biometric information registered without a change of the system by changing the random number vector R into R'. A consequently increasing calculation amount is merely doubled to $E_1(A)$ and $E_2(R)$ since homomorphic encryption addition is executed twice and information to be stored is the encrypted biometric information $E_1(A)$.

There is also a method called a multiplicative mask. In this case, a random number vector $R=(r_0, r_1, \ldots)$ which is unique to a user, secret, and cryptographically secure is generated and its inverse $R^{-1}=(r_0^{-1}, r_1^{-1}, \ldots)$ is calculated. Then, a multiplication operation is performed on each term of the vector A indicating biometric information using the random number vector R. That is, $A \times R^{-1}=(a_1 \times r_1^{-1}, a_2 \times r_2^{-1}, \ldots)$ is calculated. Subsequently, $A \times R^{-1}$, R, and $R^{-1}$ are polynomialized into two types and are encrypted by homomorphic encryption E using the public key pk to calculate encrypted texts $E_1(A \times R^{-1})$, $E_1(R^{-1})$, and $E_2(R)$. The polynomialization and the homomorphic encryption described above may be used. Likewise, for vector B, an encrypted text $E_2(B+R)$ using the homomorphic encryption for the random number R and the public key pk is calculated. From the properties of the homomorphic encryption, an encrypted text of the Hamming distance HD (A, B) between two plain vectors may be generated from two encrypted texts. R may be stored in a memory such as a non-volatile memory. The encrypted text of the Hamming distance HD (A, B) is represented by the following expression (30).

$$E(HD)=E_1(A \times R^{-1}) \times E_2(R)+E_1(R^{-1}) \times E_2(B \times R)-2E_1(A \times R^{-1}) \times E_2(B \times R) \quad (30)$$

Here, the user may cancel encryption biometric information registered without a change of the system by changing the random number vector R into R'. A consequently increasing calculation amount is merely tripled to $E_1(A \times R^{-1})$, $E_1(R^{-1})$, and $E_2(R)$ since the calculation amount is the same as the original calculation amount and information to be stored is the encrypted biometric information $E_1(A)$.

Figure 10:
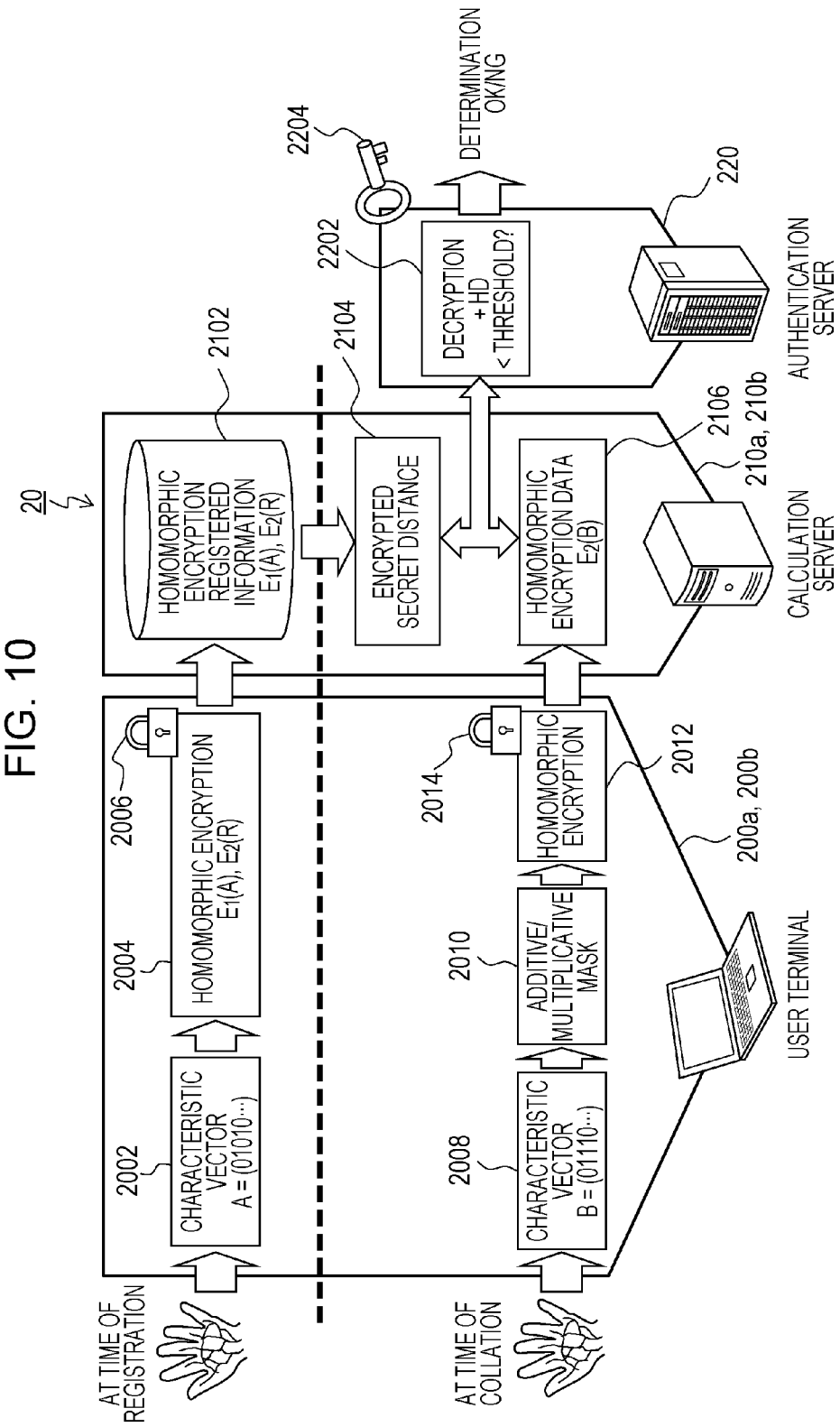
FIG. 10 is a diagram illustrating an overview of a biometric authentication system using homomorphic encryption according to an embodiment.

FIG. 10 is a diagram illustrating an overview of a biometric authentication system using the homomorphic encryption according to the embodiment. A biometric authentication system 20 illustrated in FIG. 10 is sometimes called an encryption processing device.

When the additive mask is used, the biometric authentication system 20 illustrated in FIG. 10 includes a client terminal 200a (hereinafter, the client terminal is sometimes simply called a terminal), a calculation server 210a, and an authentication server 220. When the multiplicative mask is used, the biometric authentication system 20 includes a client terminal 200b (hereinafter, the client terminal is sometimes simply called a terminal), a calculation server 210b, and an authentication server 220.

In the biometric authentication system 20, the user inputs biometric information such as a fingerprint or a vein to a terminal 200a (200b) at the time of registration of the biometric information. A binarization unit 2002 of the terminal 200 extracts a characteristic amount and vectorizes the biometric information to obtain vector A. Further, an encryption unit 2004 performs the polynomial conversion and the homomorphic encryption on the vector A and the random number R to obtain $E_1(A)$ and $E_2(R)$ in the case of the additive mask and to obtain $E_1(A \times R^{-1})$, $E_1(R^{-1})$, and $E_2(R)$ in the case of the multiplicative mask. $E_2(R)$ (in the case of the additive mask) ($E_1(R^{-1})$ and $E_2(R)$ in the case of the multiplicative mask) is sometimes called a random number polynomial. The vector A and the random number R are converted into other polynomials. The examples of polynomial 1 and polynomial 2 may be a(x) and b(x) as following expressions (31).

$$a(x) = \sum_{i=1}^{n} a_i x^{i-1} \quad (31)$$

$$b(x) = \sum_{j=1}^{n} b_j x^{n-j+1}$$

At the time of the encryption in the encryption unit 2004, a public key 2006 is used. The encryption unit 2004 includes a memory that stores the random number R. This memory may be a non-volatile memory. The terminal 200a transmits, to the calculation server 210a, $E_1(A)$ and $E_2(R)$ in the case of the additive mask and $E_1(A \times R^{-1})$, $E_1(R^{-1})$, and $E_2(R)$ in the case of the multiplicative mask. The calculation server 210 registers the biometric information subjected to the homomorphic encryption in a database 2102.

At the time of the collation, the user inputs the biometric information to the terminal 200 and a binarization unit 2008 vectorizes the biometric information to obtain vector B. A mask unit 2010 of the terminal 200a executes the additive mask on vector B. A mask unit 2010 of the terminal 200*b* executes the multiplicative mask on vector B. An encryption unit 2012 performs the polynomial conversion of vectors B+R and the homomorphic encryption. Hereinafter, the terminals 200*a* and 200*b* are sometimes simply referred to as the terminal 200. The terminal 200 uses the additive mask or the multiplicative mask.

When the encryption unit 2012 performs the encryption, a public key 2014 is used. In the case of the additive mask, the terminal 200*a* transmits data $E_2(B+R)$ obtained by performing the homomorphic encryption on the vectorized biometric information to the calculation server 210*a*. In the case of the multiplicative mask, the terminal 200*b* transmits data $E_2(B \times R)$ obtained by performing the homomorphic encryption on the vectorized biometric information to the calculation server 210*b*.

In the calculation server 210*a* (210*b*), a secure distance calculation unit 2104 calculates a secure distance between homomorphic encrypted data $E_1(A)$ and homomorphic encrypted data $E_2(B)$ in the case of the additive mask with reference to the data stored in a database (homomorphic encryption template) 2102. Before this calculation, an unmask unit 2106 performs unmask on the homomorphic encrypted data $E_2(B+R)$ (in the case of the additive mask) or $E_2(B \times R)$ (in the case of the multiplicative mask). For example, when $E_2(B+R)$ is unmasked, $E_2(B+R) - E_2(R)$ is calculated. When $E_2(B \times R)$ is unmasked, $E_2(B \times R) \times E_2(R^{-1})$ is calculated. Then, the calculation server 210 transmits only a secure distance calculation result to the authentication server 220 having a private key 2204 of the homomorphic encryption.

A comparison unit 2202 of the authentication server 220 decrypts the received secure distance calculation result and compares a decryption result to a threshold. When the decryption result is less than the threshold, the user is authenticated.

Figure 11:
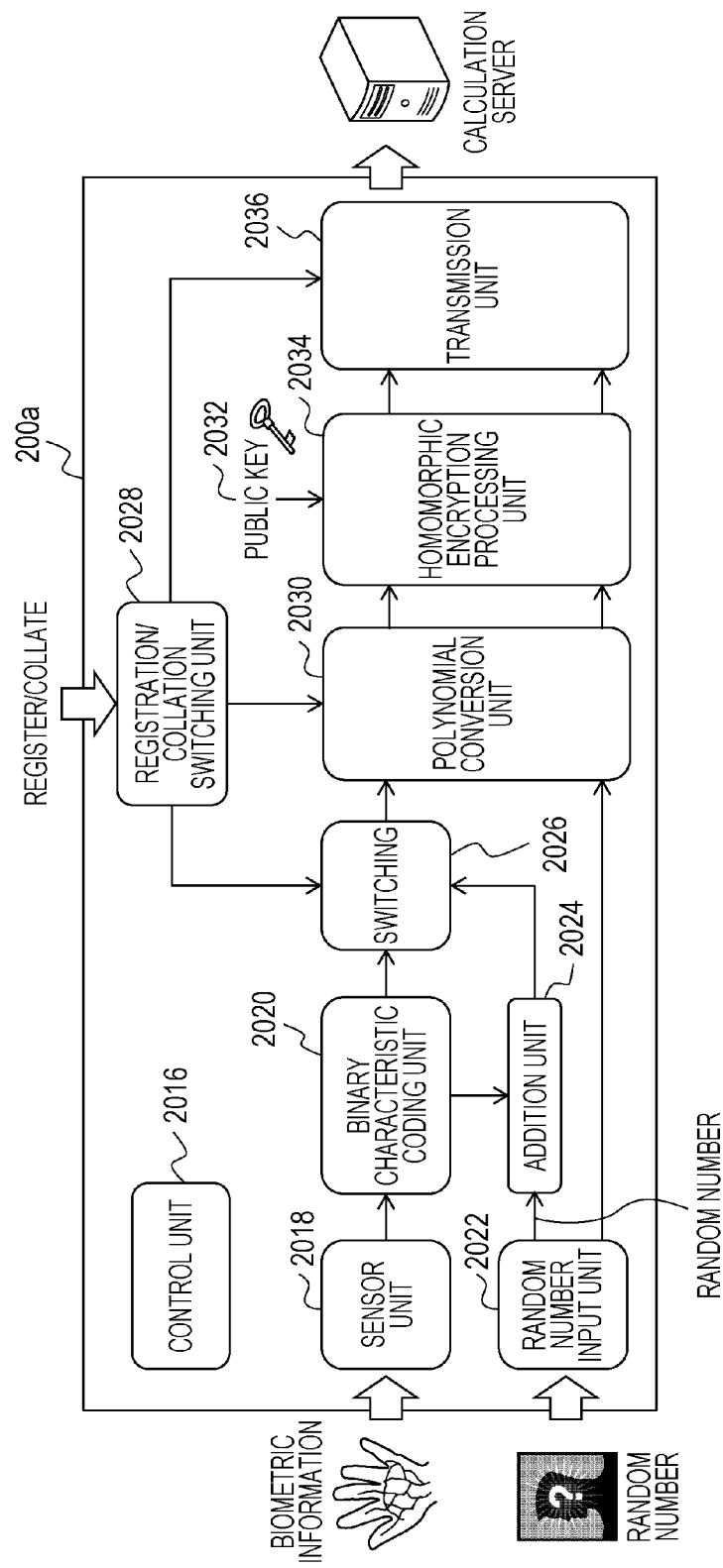
FIG. 11 is a diagram illustrating an example of a functional block of a terminal of the biometric authentication system using the homomorphic encryption according to the embodiment.

FIG. 11 is a diagram illustrating an example of a functional block of the terminal 200*a* of the biometric authentication system using the homomorphic encryption according to the embodiment in which the additive mask is used.

A sensor unit 2018 of the terminal 200*a* acquires the biometric image of the user. A random number input unit 2022 receives a random number. The random number input unit 2022 may be a memory and may store the random number. A binary characteristic coding unit 2020 binarizes, for example, a biometric image acquired by the sensor unit 2018 to generate a characteristic code. The characteristic code may be a vector. An addition unit 2024 adds the characteristic code and the random number.

A switch 2026 switches between input of an output from the binary characteristic coding unit 2020 to a polynomial conversion unit 2030 (at the time of registration) and input of an output from the addition unit 2024 to the polynomial conversion unit 2030 (at the time of collation) depending on a command which is input from the outside to the registration/collation switching unit 2028 and discriminates the time of the registration from the time of the collation.

The polynomial conversion unit 2030 performs polynomial conversion on the input A (the time of the registration) or B+R (at the time of the collation) depending on the command which is input from the outside to the registration/collation switching unit 2028 and discriminates the time of the registration from the time of the collation. The polynomial conversion unit 2030 outputs a polynomial code.

A homomorphic encryption processing unit 2034 encrypts the polynomial code using a public key 2032. The homomorphic encryption processing unit 2034 outputs encryption template/encryption collation data to transmit the encryption template/encryption collation data from a transmission unit 2036.

The sensor unit 2018, the binary characteristic coding unit 2020, the random number input unit 2022, the addition unit 2024, the switch 2026, the registration/collation switching unit 2028, the polynomial conversion unit 2030, the homomorphic encryption processing unit 2034, and the transmission unit 2036 may be controlled by the control unit 2016.

Figure 12:
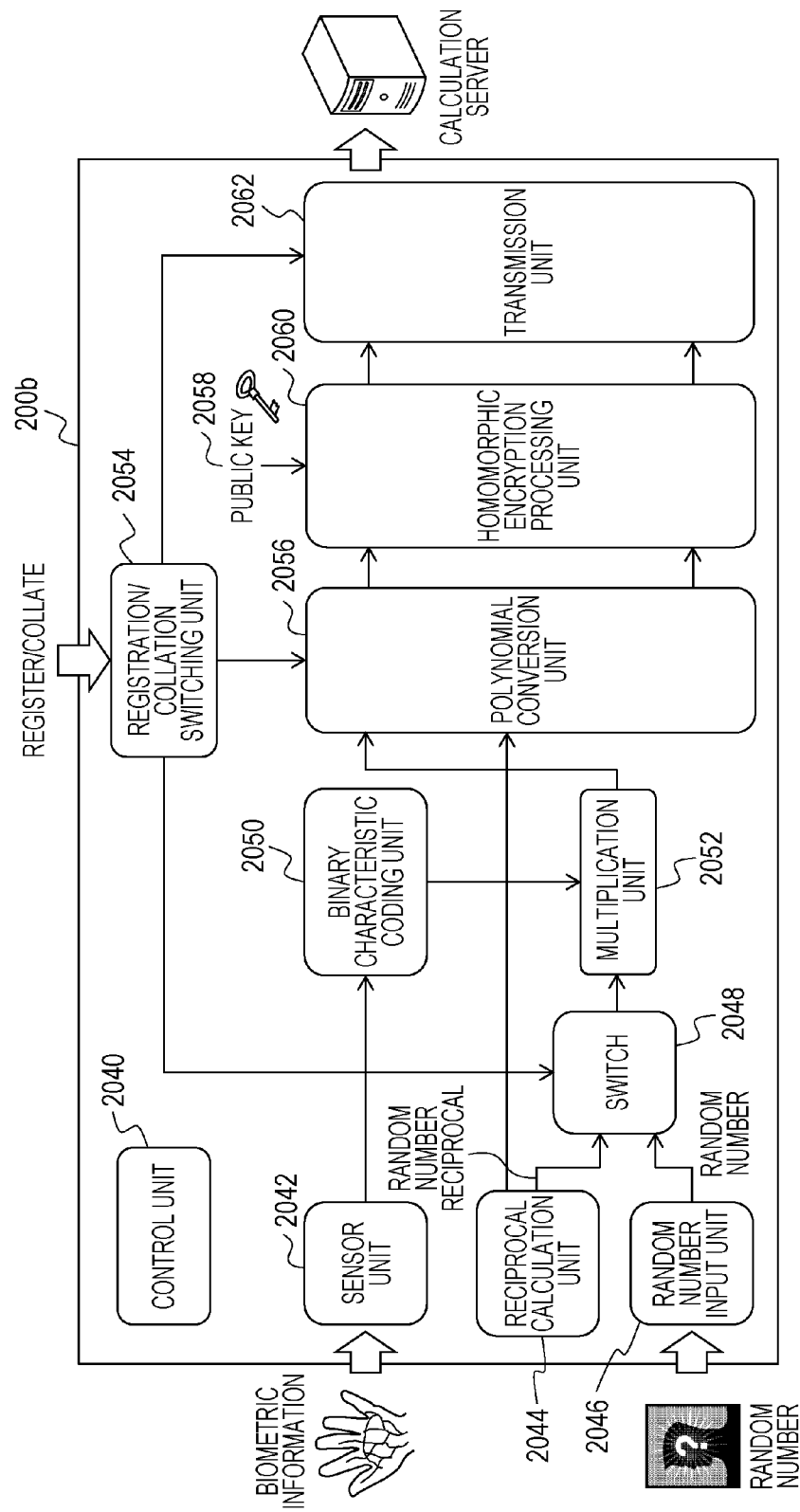
FIG. 12 is a diagram illustrating another example of the functional block of a terminal of the biometric authentication system using the homomorphic encryption according to the embodiment.

FIG. 12 is a diagram illustrating another example of the functional block of the terminal 200*b* of the biometric authentication system using the homomorphic encryption according to the embodiment in which the multiplicative mask is used.

A sensor unit 2042 of the terminal 200*b* acquires the biometric image of the user. For example, a binary characteristic coding unit 2050 binarizes the biometric image acquired by the sensor unit 2042 to generate a characteristic code. The characteristic code may be a vector. A random number input unit 2046 receives a random number. The random number input unit 2046 may be a memory and may store the random number. In this case, the random number is assumed to be rewritable from the outside. A reciprocal calculation unit 2044 calculates a reciprocal of the random number.

A switch 2048 switches between input of the random number to a multiplication unit 2052 and input of the reciprocal of the random number to the multiplication unit 2052 depending on a command which is input from the outside to the registration/collation switching unit 2054 and discriminates the time of the registration from the time of the collation.

The multiplication unit 2052 calculates $A \times R^{-1}$ at the time of the registration and calculates $B \times R$ at the time of the collation depending on the command which is input from the outside to the registration/collation switching unit 2054 and discriminates the time of the registration from the time of the collation.

A polynomial conversion unit 2056 performs polynomial conversion on the input $A \times R^{-1}$ (the time of the registration) or $B \times R$ (at the time of the collation) depending on a command which is input from the outside to the registration/collation switching unit 2054 and discriminates the time of the registration from the time of the collation and outputs a polynomial code.

A homomorphic encryption processing unit 2060 encrypts the polynomial code using a public key 2058. The homomorphic encryption processing unit 2060 outputs encryption template/encryption collation data to transmit the encryption template/encryption collation data from a transmission unit 2062.

Figure 13:
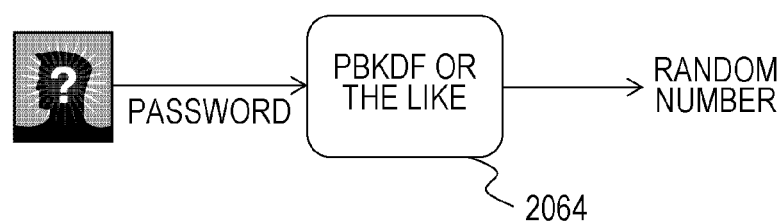
FIG. 13 is a diagram illustrating an overview of a generation example of a random number.

FIG. 13 is a diagram illustrating an overview of a generation example of a random number. The random numbers input to the random number input units 2022 and 2046 may be generated from a password or a key input from the outside using Password Base Key Derivation Function (PB-KDF) or the like by a random number generation unit 2064.

FIG. 14 is a diagram illustrating a functional block of the calculation server 210*a* (210*b*) of the biometric authentication system using the homomorphic encryption (at the time of registration) according to the embodiment.

A reception unit 2110 receives an encryption template from the terminal 200*a* (200*b*). The encryption template is stored in an encryption template storage unit 2102 by a template registration unit 2115.

FIG. 15A is a diagram illustrating an example of a data format of an encryption template according to the embodiment in which an additive mask is used.

Encryption template/encryption collation data 2142 includes, for example, a user ID, encryption templates $E_1(A)$, $E_1(C)$, and $E_2(C)$, and an encryption random number $E_2(R)$.

FIG. 15B is a diagram illustrating another example of the data format of the encryption template according to the embodiment in which an additive mask is used.

Encryption template/encryption collation data 2144 includes, for example, the user ID, an encryption template $E_1(A \times R^{-1})$, an encryption random number $E_2(R)$, and an encryption reciprocal $E_1(R^{-1})$.

FIG. 16 is a diagram illustrating an example of a functional block of the calculation server 210a of the biometric authentication system using the homomorphic encryption (at the time of collation) according to the embodiment in which an additive mask is used.

The reception unit 2110 receives the encryption collation data $E_2(B+R)$ from the terminal. A homomorphic addition unit 2114 calculates $E_2(B+R)-E_2(R)$ with reference to a random number $E_2(R)$ stored in the encryption template storage unit 2102. A homomorphic multiplication unit 2116 calculates a product $x=E_1(A) \times E_2(C)$ using $E_1(A)$ and $E_2(C)$ stored in the encryption template storage unit 2102. A homomorphic multiplication unit 2118 calculates a product $y=E_1(C) \times (E_2(B+R)-E_2(R))$ of both $E_1(C)$ and $E_2(B)$ using $E_1(C)$ stored in the encryption template storage unit 2102 and $E_2(B)$ from the encryption collation data.

A homomorphic multiplication unit 2120 calculates a product $z=E_1(A) \times (E_2(B+R)-E_2(R))$ of both $E_1(A)$ and $E_2(B+R)-E_2(R)$ using $E_1(A)$ stored in the encryption template storage unit 2102 and $(E_2(B+R)-E_2(R))$ from the encryption collation data.

A homomorphic addition unit 2122 calculates an encryption Hamming distance $E(HD)=x+y-2z$ using the outputs x, y, and z from the homomorphic multiplication unit 2116, the homomorphic multiplication unit 2118, and the homomorphic multiplication unit 2120, respectively.

The homomorphic addition unit 2114, the homomorphic multiplication unit 2116, the homomorphic multiplication unit 2118, the homomorphic multiplication unit 2120, and the homomorphic addition unit 2122 are combined to configure an encryption Hamming distance calculation unit (secure distance calculation unit) 2112. A transmission unit 2124 transmits the encryption Hamming distance E(HD).

FIG. 17 is a diagram illustrating another example of the functional block of the calculation server of the biometric authentication system using the homomorphic encryption (at the time of the collation) according to the embodiment in which a multiplicative mask is used.

A reception unit 2126 receives the encryption collation data $E_2(B \times R)$ from the terminal. A homomorphic multiplication unit 2132 calculates a product $x=E_1(A \times R) \times E_2(R)$ using the encryption random number $E_2(R)$ and $E_1(A \times R^{-1})$ from the encryption collation data 2102.

A homomorphic multiplication unit 2134 calculates a product $y=E_2(B \times R) \times E_1(R^{-1})$ of both $E_1(R^{-1})$ and $E_2(B \times R)$ using an encryption reciprocal $E_1(R^{-1})$ and $E_2(B \times R)$ from the encryption collation data 2102. A homomorphic multiplication unit 2136 calculates a product $z=E_1(A) \times (E_2(B+R)-E_2(R))$ using $(E_2(B+R)-E_2(R))$ from the encryption collation data and $E_1(A)$ from the encryption template storage unit 2102.

A homomorphic addition unit 2138 calculates an encryption Hamming distance $E(HD)=x+y-2z$ using the outputs x, y, and z from the homomorphic multiplication unit 2132, the homomorphic multiplication unit 2134, and the homomorphic multiplication unit 2136, respectively.

A transmission unit 2140 transmits the encryption Hamming distance E(HD).

The homomorphic multiplication unit 2132, the homomorphic multiplication unit 2134, the homomorphic multiplication unit 2136, and the homomorphic addition unit 2138 are combined to configure an encryption Hamming distance calculation unit (secure distance calculation unit) 2130.

Figure 18:
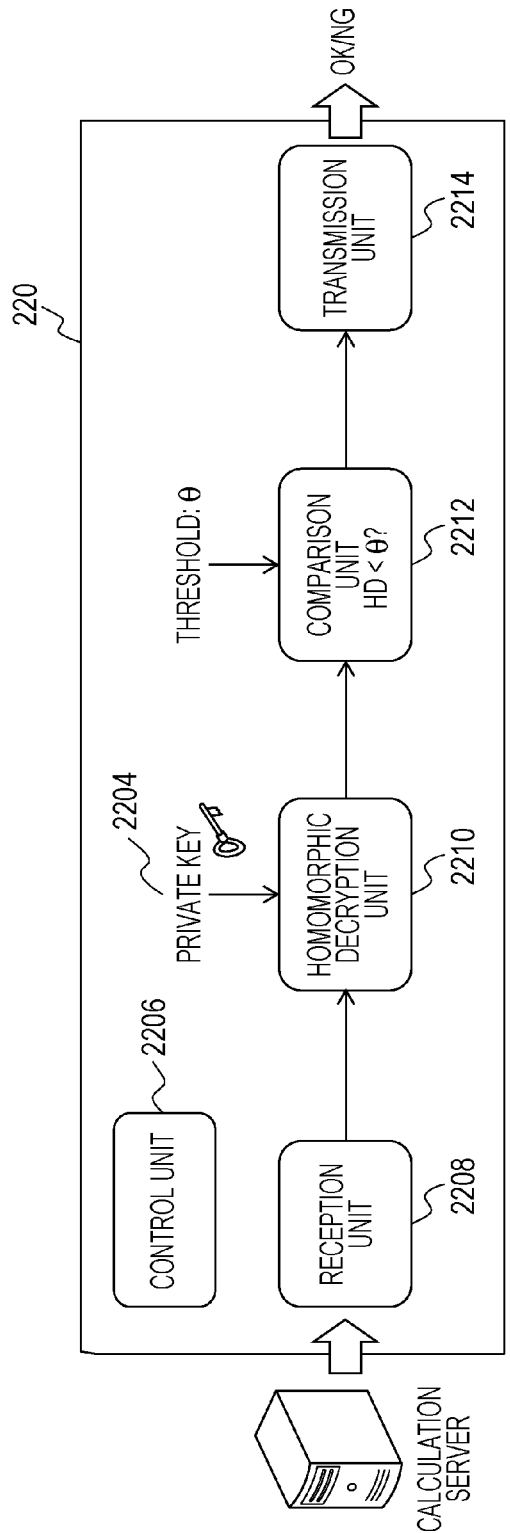
FIG. 18 is a diagram illustrating an example of the functional block of an authentication server of the biometric authentication system using the homomorphic encryption according to the embodiment.

FIG. 18 is a diagram illustrating an example of the functional block of the authentication server 220 of the biometric authentication system using the homomorphic encryption according to the embodiment.

A reception unit 2208 of the authentication server 220 receives the encryption Hamming distance E(HD) from the calculation server 210. A homomorphic decryption unit 2210 decrypts the encryption Hamming distance E(HD) using a private key 2204 to obtain the Hamming distance HD.

A comparison unit 2212 compares the Hamming distance HD to a pre-given threshold θ. When the Hamming distance HD is less than the threshold θ, the user is authenticated (OK). Otherwise, the user is not authenticated (NG).

A transmission unit 2214 transmits the comparison result (OK or NG) of the comparison unit 2212. Thus, the encryption processing device 20 includes the polynomial conversion unit 2030 or 2056, the encryption unit 2034 or 2060, the secure distance calculation unit 2112 or 2130, and the comparison unit 2212.

The polynomial conversion unit 2030 or 2056 converts first data using a first polynomial representation to obtain a first polynomial and converts, using a second polynomial representation to acquire a second polynomial, an expression obtained based on a random number corresponding to the first data and second data. And then, the polynomial conversion unit 2030 or 2056 converts the random number using at least one of the first polynomial representation and the second polynomial representation to acquire a random number polynomial.

The encryption unit 2034 or 2060 encrypts the first polynomial, the second polynomial, and the random number polynomial using the homomorphic encryption scheme to acquire the encrypted first polynomial, the encrypted second polynomial, and the encrypted random number polynomial.

The comparison unit collates the first data and the second data using the encrypted first polynomial, the encrypted second polynomial, and the encrypted random polynomial.

The secure distance calculation unit 2112 or 2130 may calculate an encryption secure distance which is a secure distance between the first data and the second data when decryption is performed using the encrypted first polynomial, the encrypted second polynomial, and the encrypted random number polynomial. In this case, the comparison unit 2212 performs the collating of the first data and the second data by comparing the secure distance to a predetermined value.

Here, the random number may have a one-to-one correspondence relation with the first vector. Since the encryption processing device includes the above-described configuration, the advantage that the encrypted information may be cancelled simply may be obtained in the encryption processing system using the homomorphic encryption.

Figure 19:
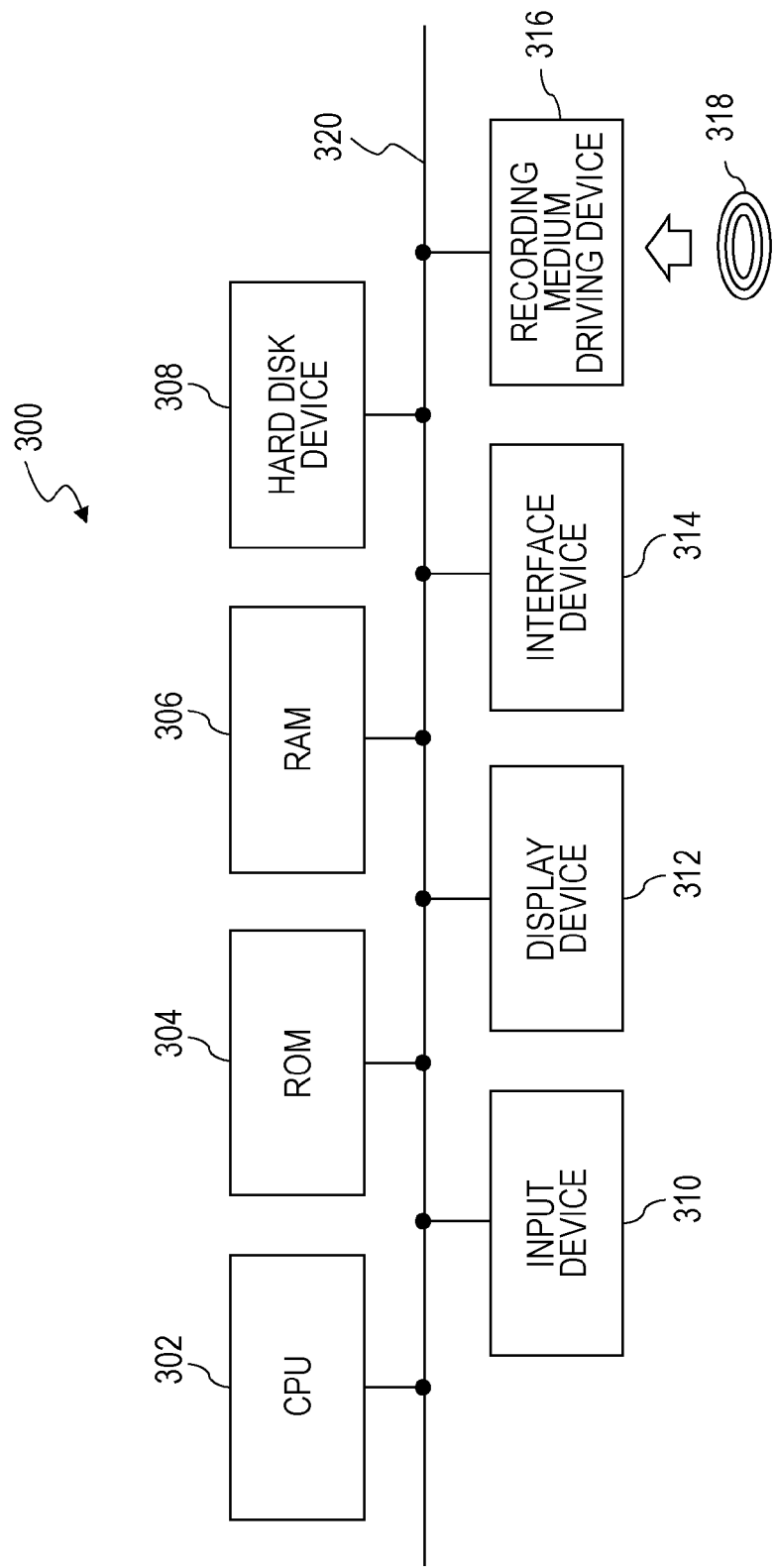
FIG. 19 is a diagram illustrating an example of the configuration of an encryption processing device using the homomorphic encryption.

FIG. 19 is a diagram illustrating an example of the configuration of an encryption processing device using the homomorphic encryption. The homomorphic encryption device may be realized as a general-purpose computer 300.

The computer 300 includes a CPU 302, a ROM 304, a RAM 306, a hard disk device 308, an input device 310, a display device 312, an interface device 314, and a recording medium driving device 316. These constituent elements are connected to each other via a bus line 320 to mutually transmit and receive various kinds of data under management of the CPU 302.

The central processing unit (CPU) 302 is an arithmetic processing device that controls an operation of the entire computer 300 and functions as a control processing unit of the computer 300.

The read-only memory (ROM) 304 is a read-only semiconductor memory on which a predetermined basic control program is recorded in advance. The CPU 302 reads and executes the basic control program when the computer 300 is activated, so that an operation of each constituent element of the computer 300 may be controlled.

The random access memory (RAM) 306 is a semiconductor memory on and from which data may be frequently written and read and which is used as a working storage area, as occasion calls, when the CPU 302 executes various kinds of control programs.

The hard disk device 308 is a storage device that stores various kinds of data and various kinds of control programs to be executed by the CPU 302. The CPU 302 may perform various control processes to be described below by reading and executing predetermined control programs stored in the hard disk device 308.

The input device 310 is, for example, a mouse device or a keyboard device. When the input device 310 is operated by a user of the system, the input device 310 acquires inputs of various kinds of information corresponding to contents of the operation and transmits the acquired input information to the CPU 302.

The display device 312 is, for example, a liquid crystal display and displays various kinds of text or images according to display data transmitted from the CPU 302. The interface device 314 manages transmission and reception of various kinds of information to and from various devices connected to the computer 300.

The recording medium driving device 316 is a device that reads various kinds of control programs or data recorded on a portable recording medium 318. The CPU 302 may also perform various control processes to be described below by reading and executing predetermined control programs stored in the portable recording medium 318 via the recording medium driving device 316. Examples of the portable recording medium 318 include a flash memory including a connector of the Universal Serial Bus (USB) standard, a Compact Disc Read Only Memory (CD-ROM), and a Digital Versatile Disc Read Only Memory (DVD-ROM).

When the encryption processing device is configured using the computer 300, for example, a control program (encryption processing program) causing the CPU 302 to execute the process of each of the above-described processing units is created. The created control program is stored in advance in the hard disk device 308 or the portable recording medium 318. Then, a predetermined instruction is given to the CPU 302 to read and execute the control program (encryption processing program). By doing so, the function of the encryption processing device is supplied by the CPU 302.

Figure 20:
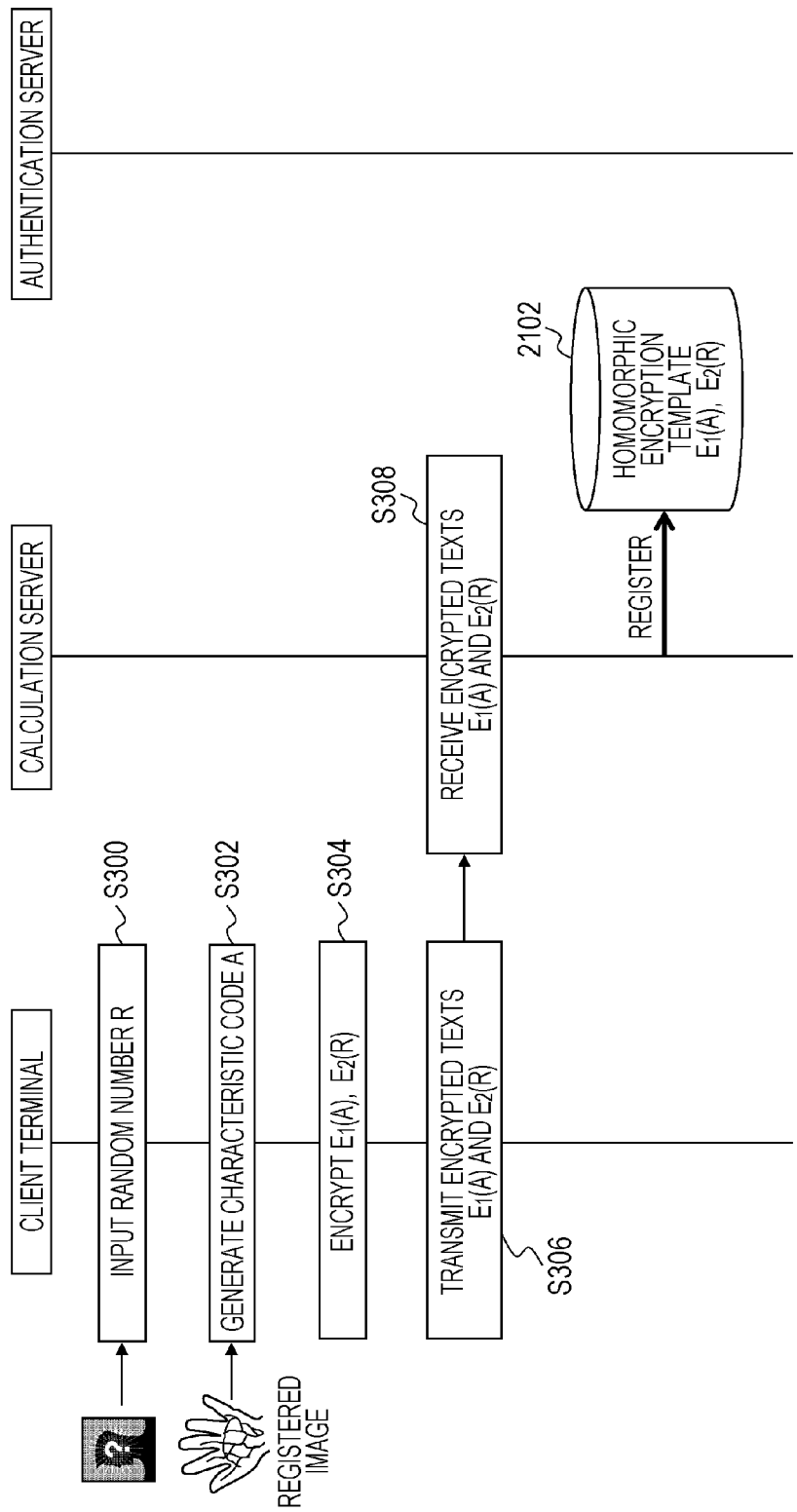
FIG. 20 is a diagram illustrating an example of the flow of a process at the time of the registration in a biometric authentication method using the homomorphic encryption according to the embodiment.

FIG. 20 is a diagram illustrating an example of the flow of a process at the time of the registration in a biometric authentication method using the homomorphic encryption according to the embodiment.

When the process starts, the binarization unit 2002 of the client terminal 200 receives an input of the random number R from the outside in S300. This random number may be prepared in advance in the binarization unit 2002 of the client terminal 200. Next, in S302, the binarization unit 2002 of the client terminal 200 generates the characteristic code A using the registered image registered for the biometric authentication. The order of the process of S300 and the process of S302 may be reversed.

Next, in S304, the encryption unit 2004 of the terminal 200 encrypts the random number R and the characteristic code A to obtain the encrypted texts $E_1(R)$ and $E_2(A)$. When the process of S302 ends, the process proceeds to S304. When the process of S304 ends, the process proceeds to S306.

In S306, the transmission unit 2036 of the terminal 200 transmits the encrypted texts $E_1(R)$ and $E_2(A)$. When the process of S306 ends, the process proceeds to S308.

In S308, the reception unit 2110 of the calculation server 210 receives the encrypted texts $E_1(R)$ and $E_2(A)$. In S308, the template registration unit 2115 of the calculation server 210 stores the encrypted texts $E_1(R)$ and $E_2(A)$ in the database (the homomorphic encryption template storage unit) 2102.

Figure 21:
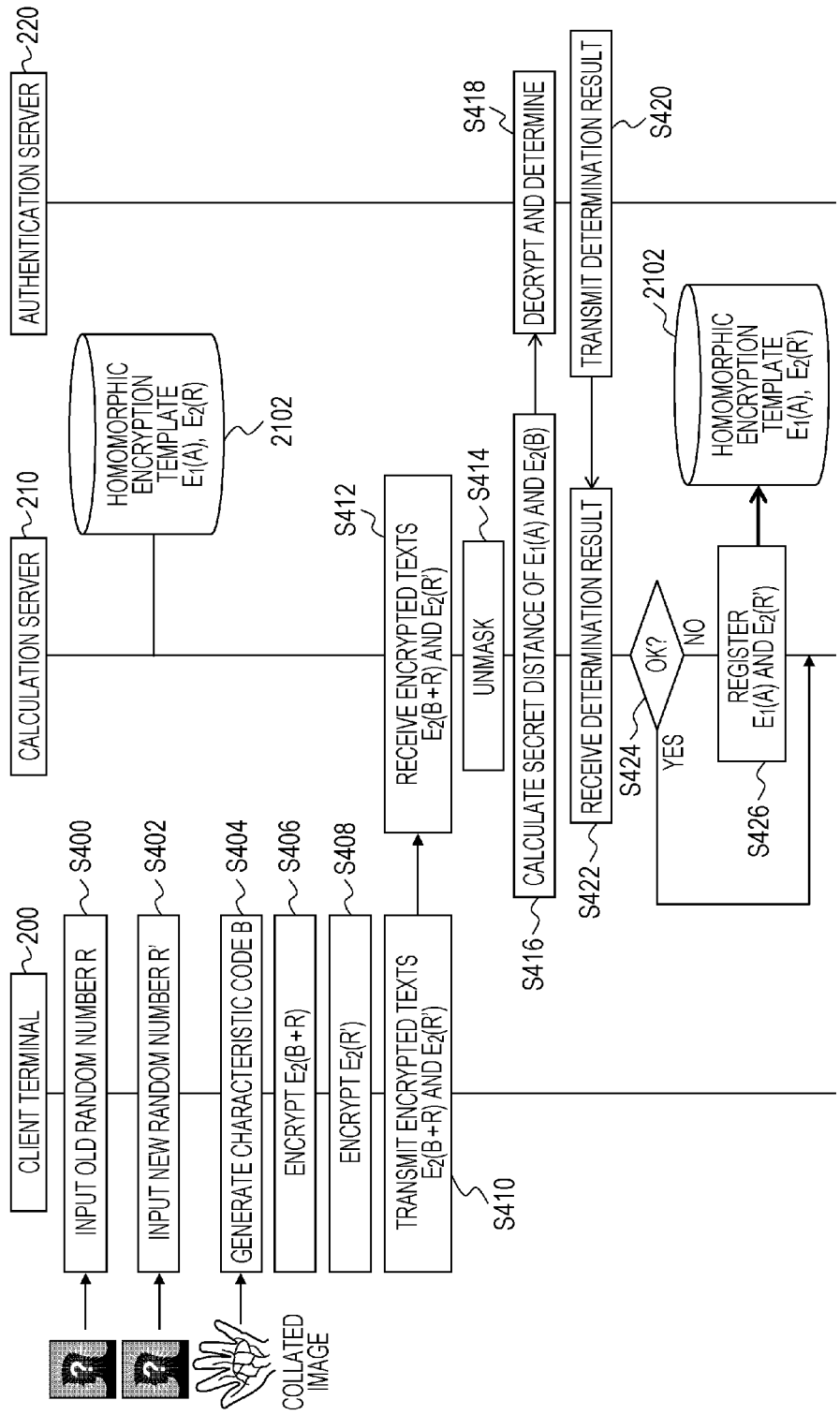
FIG. 21 is a diagram illustrating an example of the flow of a process at the time of the collation in the biometric authentication method using the homomorphic encryption according to the embodiment.

FIG. 21 is a diagram illustrating an example of the flow of a process at the time of the collation in the biometric authentication method using the homomorphic encryption according to the embodiment in which an additive mask is used.

When the encryption processing device is the general-purpose computer 300 illustrated in FIG. 19, the following description defines a control program (encryption processing program) performing the process. That is, the following description is also description of a control program (encryption processing program) causing the general-purpose computer to perform a process to be described below.

In the following process, the random number R is stored in the binarization unit 2008 of the client terminal 200, and thus a process in which the user changes the random number R into a new random number R' is included. When the process starts, the binarization unit 2008 of the client terminal 200 inputs the old random number R in S400.

Next, in S402, the binarization unit 2008 of the client terminal 200 inputs the new random number R'. Here, this step may be omitted merely in a collation process using the previous random number.

In S404, the binarization unit 2008 of the client terminal 200 generates the characteristic code B using the collated image used for the collation. The order of the processes of S400 to S404 is arbitrary.

In S406, the encryption unit 2010 of the terminal 200 encrypts the sum B+R of the characteristic code B and the random number R to obtain the encrypted text $E_2(B+R)$. When the process of this step ends, the process proceeds to S408.

In S408, the encryption unit 2010 of the terminal 200 encrypts the random number R' to obtain $E_2(R')$. When the process of this step ends, the process proceeds to S410. Here, this step may be omitted merely for the collation process using the previous random number.

In S410, the transmission unit 2026 of the terminal 200 transmits $E_2(B+R)$ and $E_2(R')$. Here, only $E_2(B+R)$ may be transmitted merely for the collation process using the previous random number. When the process of this step ends, the process proceeds to S412.

In S412, the reception unit 2110 of the calculation server 210 receives $E_2(B+R)$ and $E_2(R')$. When the process of this step ends, the process proceeds to S414. Next, in S414, the unmask unit 2106 of the calculation server 210 performs unmask processing. In the case of the additive mask, the unmask processing may be performed by calculating $E_2(B+R)-E_2(R)$. When the process of this step ends, the process proceeds to S416.

In S416, the secure distance calculation unit 2104 of the calculation server 210 calculates the secure distance between $E_1(A)$ and $E_2(B)$, for example, the Hamming distance HD. In S416, the transmission unit 2124 of the calculation server 210 transmits the calculation result to the authentication server 220. When the process of this step ends, the process proceeds to S418.

In S418, the reception unit 2208 of the authentication server 220 receives the encrypted secure distance transmitted from the calculation server 210, for example, the Hamming distance HD, and the homomorphic decryption unit 2210 decrypts the secure distance. Then, the comparison unit 2212 compares the threshold θ to the decrypted Hamming distance HD. When the Hamming distance HD is less than the threshold θ, the user is authenticated (OK). Otherwise, the user is not authenticated (NG).

Next, in S420, the transmission unit 2214 of the authentication server 220 transmits the determination result to the calculation server 210. When the process of this step ends, the process proceeds to S422.

In S422, the reception unit 2110 of the calculation server 210 receives the determination result. When the process of this step ends, the process proceeds to S424.

In S424, the calculation server 210 determines whether the user is authenticated. When the determination result is "YES", that is, the user to be collated is not a new user, a new process is not performed and the process ends. When the determination result is "NO", that is, the user to be collated is a new user, the process proceeds to S426 to cancel the encrypted biometric information registered by the user. In S426, the calculation server 210 registers $E_1(A)$ and $E_2(R')$ in the database 2102.

Figure 22:
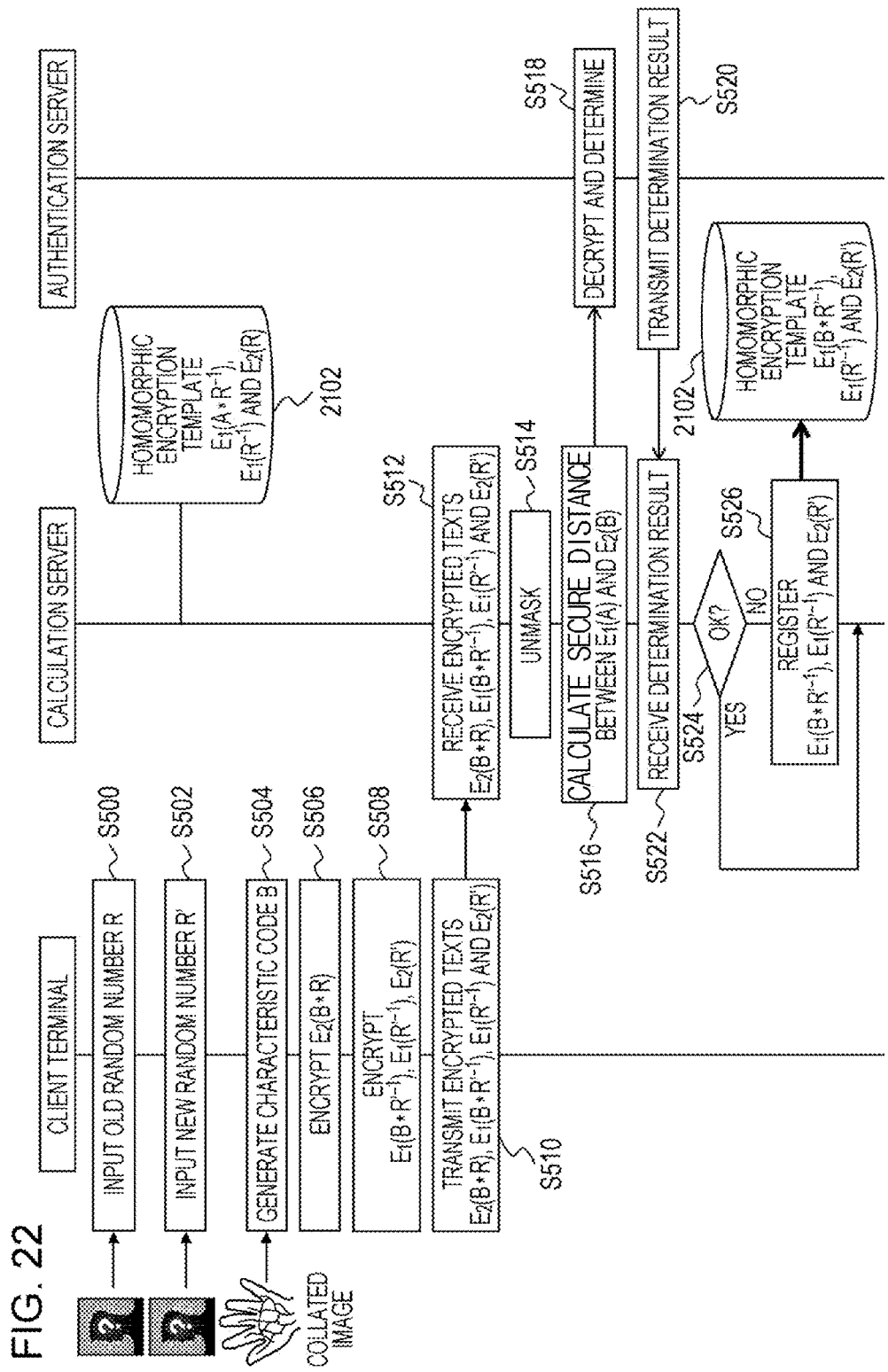
FIG. 22 is a diagram illustrating another example of the flow of the process at the time of the collation in the biometric authentication method using the homomorphic encryption according to the embodiment.

FIG. 22 is a diagram illustrating an example of the flow of the process at the time of the collation in the biometric authentication method using the homomorphic encryption according to the embodiment in which a multiplicative mask is used.

When the encryption processing device is the general-purpose computer 300 illustrated in FIG. 19, the following description defines a control program (encryption processing program) performing the process. That is, the following description is also description of a control program (encryption processing program) causing the general-purpose computer to perform a process to be described below.

When the process starts, the binarization unit 2008 of the client terminal 200 inputs the old random number R in S500. Next, in S502, the binarization unit 2008 of the client terminal 200 inputs the new random number R'. Here, this step may be omitted merely in a collation process using the previous random number.

In S504, the binarization unit 2008 of the client terminal 200 generates the characteristic code B using the collated image used for the collation. The order of the processes of S500 to S504 is arbitrary.

In S506, the encryption unit 2010 of the terminal 200 encrypts the product B×R of the characteristic code B and the random number R to obtain the encrypted text $E_2(B\times R)$. When the process of this step ends, the process proceeds to S508.

In S508, the encryption unit 2010 of the terminal 200 encrypts a product $B\times R'^{-1}$ of the characteristic code B and a reciprocal of the random number R, the reciprocal $R'^{-1}$ of the random number R, and the random number R' to obtain $E_1(B\times R'^{-1})$, $E_1(R'^{-1})$, and $E_2(R')$. When the process of this step ends, the process proceeds to S510. Here, this step may be omitted merely for the collation process using the previous random number.

In S510, the transmission unit 2026 of the terminal 200 transmits $E_2(B\times R)$, $E_1(B\times R'^{-1})$, $E_1(R'^{-1})$, and $E_2(R')$. Here, only $E_2(B\times R)$ may be transmitted merely for the collation process using the previous random number. When the process of this step ends, the process proceeds to S512.

In S512, the reception unit 2110 of the calculation server 210 receives $E_2(B\times R)$, $E_1(B\times R'^{-1})$, $E_1(R'^{-1})$, and $E_2(R')$. When the process of this step ends, the process proceeds to S514. Next, in S514, the unmask unit 2106 of the calculation server 210 performs unmask processing. In the case of the additive mask, the unmask processing may be performed by calculating $E_2(B\times R)\times E_2(R^{-1})$. When the process of this step ends, the process proceeds to S516.

In S516, the secure distance calculation unit 2104 of the calculation server 210 calculates the secure distance between $E_1(A)$ and $E_2(B)$, for example, the Hamming distance HD. In S516, the transmission unit 2124 of the calculation server 210 transmits the calculation result to the authentication server 220. When the process of this step ends, the process proceeds to S518.

In S518, the reception unit 2208 of the authentication server 220 receives the encrypted secure distance transmitted from the calculation server 210, for example, the Hamming distance HD, and the homomorphic decryption unit 2210 decrypts the secure distance. Then, the comparison unit 2212 compares the threshold θ to the decrypted Hamming distance HD. When the Hamming distance HD is less than the threshold θ, the user is authenticated (OK). Otherwise, the user is not authenticated (NG).

Next, in S520, the transmission unit 2214 of the authentication server 220 transmits the determination result to the calculation server 210. When the process of this step ends, the process proceeds to S522. In S522, the reception unit 2110 of the calculation server 210 receives the determination result. When the process of this step ends, the process proceeds to S524. In S524, the calculation server 210 determines whether the user is authenticated. When the determination result is "YES", that is, the user to be collated is not a new user, a new process is not performed and the process ends. When the determination result is "NO", that is, the user to be collated is a new user, the process proceeds to S526 to cancel the encrypted biometric information registered by the user. In S526, the calculation server 210 registers $E_1(B\times R'^{-1})$, $E_1(R'^{-1})$, and $E_2(R')$ in the database 2102.

By using the above-described processes, the advantage that the encrypted information may be cancelled simply may be obtained in the encryption processing system using the homomorphic encryption.

In the above-described method, it is possible to obtain the advantages that the random number R may be changed into R' and it is not desired to re-register the encryption biometric information in regard to the cancellation and re-registration of the biometric characteristic vector by the user.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An encryption processing method for authenticating a user at a client terminal, the method comprising:
converting a first vector using a first polynomial representation to acquire a first polynomial, the first vector corresponding to first authentication information;
converting an expression using a second polynomial representation to acquire a second polynomial, the expression being obtained based on a second vector and a random number, the second vector corresponding to second authentication information;
converting the random number using at least one of the first polynomial representation and the second polynomial representation to acquire a random number polynomial;
encrypting the first polynomial, the second polynomial, and the random polynomial using a homomorphic encryption scheme to acquire the encrypted first polynomial, the encrypted second polynomial, and the encrypted random polynomial;
transmitting the encrypted first polynomial, the encrypted second polynomial, and the encrypted random polynomial;
receiving the encrypted first polynomial, the encrypted second polynomial, and the encrypted random polynomial;
decrypting the received encrypted first polynomial, the received encrypted second polynomial, and the received encrypted random polynomial, to generate decrypted first polynomial, decrypted second polynomial, and decrypted random polynomial, respectively;
determining a first resolved value of the decrypted first polynomial;
determining a second resolved value of the decrypted second polynomial;
calculating a difference between the first resolved value and the second resolved value; and
authenticating a user when the difference is less than a threshold.

2. The encryption processing method according to claim 1, wherein the expression being obtained based on the second vector and the random number is identical to a sum of the first vector and the random number.

3. The encryption processing method according to claim 1, wherein the expression being obtained based on the second vector and the random number is identical to a product of the second vector and the random number.

4. The encryption processing method according to claim 1, further comprising:
generating the random number using a password input.

5. The encryption processing method according to claim 1, wherein
the first polynomial representation is formed so that components of the first vector are arranged in an ascending order of power and the second polynomial representation is formed so that components of the second vector are arranged in a descending order of power, or
the first polynomial representation is formed so that the components of the first vector are arranged in the descending order of power and the second polynomial representation is formed so that the components of the second vector are arranged in the ascending order of power.

6. An encryption processing device for authenticating a user, the encryption processing device comprising:
a memory; and
at least one processor coupled to the memory and configured to:
convert a first vector using a first polynomial representation to acquire a first polynomial, the first vector corresponding to first authentication information;
convert an expression obtained based on a second vector and a random number using a second polynomial representation to acquire a second polynomial, the second vector corresponding to second authentication information,
convert the random number using at least one of the first polynomial representation and the second polynomial representation to acquire a random number polynomial, and
encrypt the first polynomial, the second polynomial, and the random polynomial using a homomorphic encryption scheme to acquire the encrypted first polynomial, the encrypted second polynomial, and the encrypted random polynomial;
transmit the encrypted first polynomial, the encrypted second polynomial, and the encrypted random polynomial;
receive the encrypted first polynomial, the encrypted second polynomial, and the encrypted random polynomial;
decrypt the received encrypted first polynomial, the received encrypted second polynomial, and the received encrypted random polynomial, to generate decrypted first polynomial, decrypted second polynomial, and decrypted random polynomial, respectively;
determine a first resolved value of the decrypted first polynomial;
determine a second resolved value of the decrypted second polynomial;
calculate a difference between the first resolved value and the second resolved value; and
authenticate a user when the difference is less than a threshold.

7. The encryption processing device according to claim 6, wherein the expression being obtained based on the second vector and the random number is identical to a sum of the first vector and the random number.

8. The encryption processing device according to claim 6, wherein the expression being obtained based on the second vector and the random number is identical to a product of the second vector and the random number.

9. The encryption processing device according to claim 6, wherein the at least one processor is further configured to:
generate the random number using a password input from outside of the encryption processing device.

10. The encryption processing device according to claim 6, wherein the at least one processor is further configured to:
form the first polynomial representation so that components of the first vector are arranged in an ascending order of power and the second polynomial representation so that components of the second vector are arranged in a descending order of power, or
form the first polynomial representation so that the components of the first vector are arranged in the descending order of power and the second polynomial representation so that the components of the second vector are arranged in the ascending order of power.

11. A non-transitory computer-readable recording medium having stored therein a program for causing a computer to authenticate a user, the process comprising:
converting a first vector using a first polynomial representation to acquire a first polynomial, the first vector corresponding to first authentication information;
converting an expression obtained based on a second vector and a random number using a second polynomial representation to acquire a second polynomial, the second vector corresponding to second authentication information;
converting the random number using at least one of the first polynomial representation and the second polynomial representation to acquire a random number polynomial;
encrypting the first polynomial, the second polynomial, and the random polynomial using a homomorphic encryption scheme to acquire the encrypted first polynomial, the encrypted second polynomial, and the encrypted random polynomial;
decrypting the received encrypted first polynomial, the received encrypted second polynomial, and the received encrypted random polynomial, to generate decrypted first polynomial, decrypted second polynomial, and decrypted random polynomial, respectively;
determining a first resolved value of the decrypted first polynomial;
determining a second resolved value of the decrypted second polynomial;
calculating a difference between the first resolved value and the second resolved value; and
authenticating a user when the difference is less than a threshold.

12. The non-transitory computer-readable recording medium having stored therein the program for causing the computer to execute the process for encryption according to claim 11, wherein the expression being obtained based on the second vector and the random number is identical to a sum of the first vector and the random number.

13. The non-transitory computer-readable recording medium having stored therein the program for causing the computer to execute the process for encryption according to claim 11, wherein the expression being obtained based on the second vector and the random number is identical to a product of the second vector and the random number.

14. The non-transitory computer-readable recording medium having stored therein the program for causing the computer to execute the process for encryption according to claim 11, the processes further comprising:
generating the random number using a password input.

15. The non-transitory computer-readable recording medium having stored therein the program for causing the computer to execute the process for encryption according to claim 11, wherein
the first polynomial representation is formed so that components of the first vector are arranged in an ascending order of power and the second polynomial representation is formed so that components of the second vector are arranged in a descending order of power, or
the first polynomial representation is formed so that the components of the first vector are arranged in the descending order of power and the second polynomial representation is formed so that the components of the second vector are arranged in the ascending order of power.

* * * * *